(12) United States Patent
Nakayoshi et al.

(10) Patent No.: US 11,140,296 B2
(45) Date of Patent: Oct. 5, 2021

(54) IMAGE READING APPARATUS

(71) Applicant: CANON KABUSHIKI KAISHA, Tokyo (JP)

(72) Inventors: Asahiro Nakayoshi, Chiba (JP); Shinichi Ikoma, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/089,521

(22) Filed: Nov. 4, 2020

(65) Prior Publication Data

US 2021/0144273 A1 May 13, 2021

(30) Foreign Application Priority Data

Nov. 11, 2019 (JP) .............................. JP2019-204181
Jan. 29, 2020 (JP) .............................. JP2020-012171
Oct. 5, 2020 (JP) .............................. JP2020-168327

(51) Int. Cl.
*H04N 1/387* (2006.01)
*H04N 1/00* (2006.01)

(52) U.S. Cl.
CPC ....... *H04N 1/3878* (2013.01); *H04N 1/00718* (2013.01); *H04N 1/00748* (2013.01); *H04N 1/00809* (2013.01)

(58) Field of Classification Search
CPC .......... H04N 1/00718; H04N 1/00748; H04N 1/00809; H04N 1/3878; H04N 1/4092; H04N 2201/0094; H04N 1/00002; H04N 1/00694; H04N 1/00681; B65H 2220/01; B65H 2511/10; B65H 2511/216; B65H 2511/242; B65H 2511/414; B65H 2220/02; B65H 2220/03; B65H 2402/46; B65H 2801/39; B65H 3/063; B65H 3/0653;
(Continued)

(56) References Cited

U.S. PATENT DOCUMENTS 5,818,976 A * 10/1998 Pasco ................. H04N 1/00718
382/289
6,034,784 A * 3/2000 Gatto ................. H04N 1/00681
358/1.18
(Continued)

FOREIGN PATENT DOCUMENTS

JP 2005-148928 6/2005

OTHER PUBLICATIONS

U.S. Appl. No. 17/089,557, filed Nov. 4, 2020.

*Primary Examiner* — Negussie Worku
(74) *Attorney, Agent, or Firm* — Venable LLP

(57) ABSTRACT

An image reading apparatus includes an original tray, a conveyer, a reading unit, an acquisition unit, one or more processors, an acquisition unit, a setting unit, and a corrector. The acquisition unit is configured to acquire information relating to a length of the original to be read by the reading unit in a main scanning direction orthogonal to the conveying direction, and the setting unit is configured to set an ineffective region based on the information acquired by the acquisition unit, wherein the ineffective region is a region in the main scanning direction of the pixel data which is not to be used for determination of an inclination amount corresponding to an inclination angle, with respect to the main scanning direction, of a side at a leading edge of the original in the conveying direction.

14 Claims, 16 Drawing Sheets

(58) Field of Classification Search
CPC ........ B65H 7/02; B65H 7/20; G06K 2209/01;
G06K 9/3283; G06T 3/608
USPC ......................................................... 358/488
See application file for complete search history.

(56) References Cited

U.S. PATENT DOCUMENTS

| | | | |
|---|---|---|---|
| 6,912,325 B2 * | 6/2005 | Rombola ............. | G06K 9/3283 |
| | | | 358/488 |
| 10,334,137 B2 | 6/2019 | Noro et al. .......... | H04N 1/3878 |
| 2011/0075168 A1 * | 3/2011 | Ikari .................... | H04N 1/3878 |
| | | | 358/1.9 |
| 2011/0200341 A1 * | 8/2011 | Moriya ................. | B65H 9/002 |
| | | | 399/16 |
| 2015/0151358 A1 * | 6/2015 | Yamaoka .............. | B22D 19/04 |
| | | | 164/109 |
| 2016/0127606 A1 * | 5/2016 | Yabuuchi ............. | H04N 1/3878 |
| | | | 358/1.12 |
| 2017/0155796 A1 * | 6/2017 | Watanabe ........... | H04N 1/00748 |
| 2019/0112139 A1 * | 4/2019 | Hirayama ............ | B65H 7/02 |

\* cited by examiner

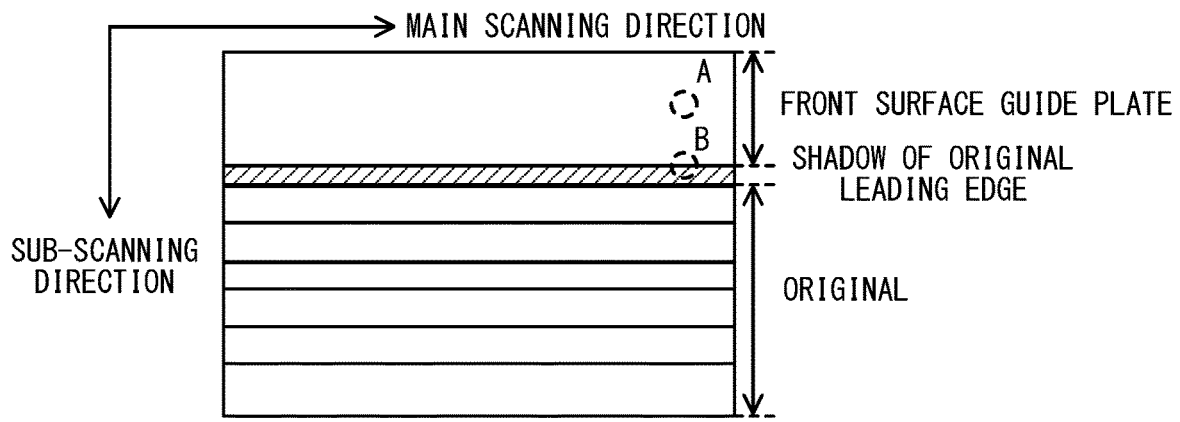
FIG. 4A
POINT A
|  | n−1 | n | n+1 |
|---|---|---|---|
| m−1 | P0 (254) | P1 (255) | P2 (253) |
| m | P3 (252) | P4 (255) | P5 (253) |
| m+1 | P6 (255) | P7 (254) | P8 (250) |
pmax−pmin=SMALL
(p1:255)−(p8:250)=5 <pth(14)
POINT B
|  | n−1 | n | n+1 |
|---|---|---|---|
| m−1 | P0 (232) | P1 (238) | P2 (235) |
| m | P3 (228) | P4 (229) | P5 (231) |
| m+1 | P6 (226) | P7 (222) | P8 (229) |
pmax−pmin=LARGE
(p1:238)−(p8:222)=16 >pth(14)
FIG. 4B
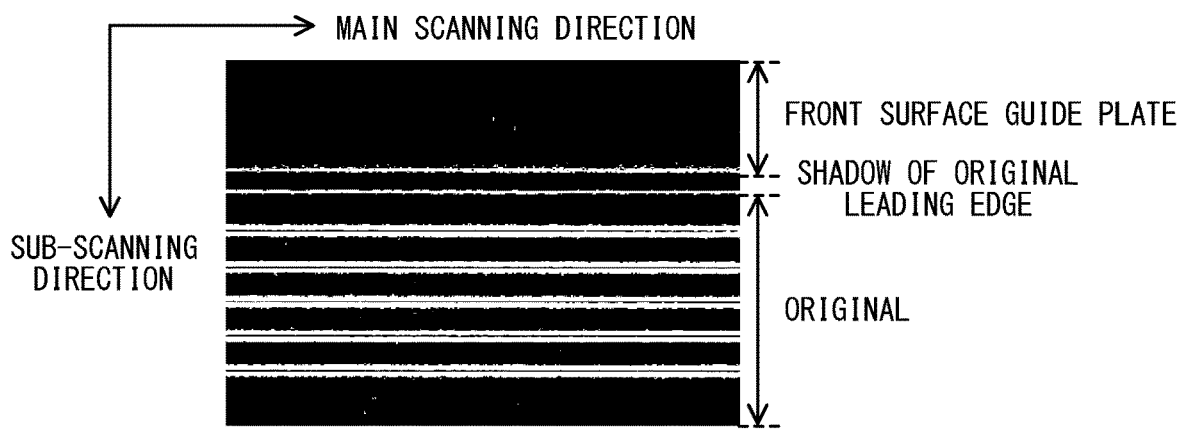
FIG. 4C

IMAGE READING APPARATUS

BACKGROUND OF THE INVENTION

Field of the Invention

The present disclosure relates to an image reading apparatus configured to read an image of an original being conveyed.

Description of the Related Art

There is known an image reading apparatus including an auto document feeder (ADF). The image reading apparatus is configured to read images of sheet-like originals, which are being conveyed to a reading position one by one by the ADF, line by line with a direction orthogonal to a conveying direction of the original being set as a main scanning direction. The use of the ADF enables the image reading apparatus to continuously read images of a plurality of originals.

In such an image reading apparatus, an original may be conveyed with a side at a leading edge of the original in the conveying direction being inclined with respect to the main scanning direction due to, for example, variations in nip pressure and rotation speed of conveyance rollers configured to convey the original and a manufacturing error. This is called "skew feeding". When the original is read in a skewed state, an image of a reading result is also inclined.

In U.S. Ser. No. 10/334,137 (B2), there is disclosed an image reading apparatus configured to rotationally correct image data representing a reading result. This image reading apparatus detects a leading edge of an original based on the image data obtained by reading the original. Specifically, the image reading apparatus detects the leading edge of the original based on the image data near a center position of the original in the main scanning direction excluding regions corresponding to corner portions of the original. The image reading apparatus further detects a skew feeding amount of the original based on the detected leading edge, and performs skew feeding correction (rotation correction) on the image data based on the detected skew feeding amount. Exclusion of predetermined regions corresponding to corner portions of the original prevents erroneous detection of the skew feeding amount due to breakage or fold at both ends of the original. In the following description, a region excluding the predetermined regions corresponding to the corner portions of the original in the main scanning direction, that is, a region of image data in the main scanning direction, which is to be used when the leading edge is detected, is referred to as "edge detection region".

The breakage or fold at both ends of the original can occur when the stapled original bundle is separated into individual sheets for conveyance by the ADF. For example, in general, a small-size sheet, for example, a business card, is less likely to be stapled than an A4-size original. With the configuration disclosed in U.S. Ser. No. 10/334,137 (B2), image data on the predetermined regions is excluded at a time of detecting the leading edge even for a small-size sheet, for example, a business card, which is unlikely to be stapled. When the image data on the predetermined regions is excluded at the time of detecting the leading edge of a small-size sheet, for example, a business card, a pixel width in the main scanning direction, which is required to detect the skew feeding amount, is not be ensured, and detection accuracy of the skew feeding amount may decrease. The decrease in detection accuracy of the skew feeding amount causes distortion of the read image, and hinders output of a preferred product. In view of the above-mentioned problems, the present disclosure has a main object to provide an image reading apparatus configured to suppress a decrease in detection accuracy of a skew feeding amount of an original.

SUMMARY OF THE INVENTION

An image reading apparatus according to the present disclosure includes: an original tray configured to receive an original to be placed on the original tray; a conveyor configured to convey the original placed on the original tray in a conveying direction; a reading unit configured to read an image of the original conveyed by the conveyor, the reading unit including: a light-receiving element configured to receive light; and a generator configured to generate pixel data representing a light reception result obtained by the light-receiving element; an acquisition unit configured to acquire information relating to a length of the original to be read by the reading unit in a main scanning direction orthogonal to the conveying direction; one or more processors, at least one of the one or more processors operating to determine a position of one end portion and a position of another end portion of the image of the original in the main scanning direction, the image being represented by a plurality of pieces of pixel data generated by the generator; a setting unit configured to set an ineffective region based on the information acquired by the acquisition unit, wherein the ineffective region is a region in the main scanning direction of the pixel data which is not to be used for determination of an inclination amount corresponding to an inclination angle, with respect to the main scanning direction, of a side at a leading edge of the original in the conveying direction, the ineffective region includes: a region between the position of the one end portion and a position spaced apart from the position of the one end portion in the main scanning direction by a setting distance; and a region between a position spaced apart from the position of the another end portion in the main scanning direction by the setting distance and the position of the another end portion, the setting distance being shorter than a distance between the position of the one end portion and a center position of the image of the original in the main scanning direction, the image being represented by the plurality of pieces of pixel data, the setting unit being configured to set the setting distance so that a length of the ineffective region in the main scanning direction when the length of the original in the main scanning direction is a first length is longer than a length of the ineffective region in the main scanning direction when the length of the original in the main scanning direction is a second length, which is shorter than the first length; and a corrector configured to perform skew correction, wherein the at least one of the one or more processors operates to determine the inclination amount based on the plurality of pieces of pixel data which corresponds to the side at the leading edge of the original included in a region except for the ineffective region in the main scanning direction, and wherein the corrector is configured to perform the skew correction for correcting the image represented by the pixel data so as to reduce the inclination amount determined by the at least one of the one or more processors.

Further features of the present invention will become apparent from the following description of exemplary embodiments (with reference to the attached drawings).

BRIEF DESCRIPTION OF THE DRAWINGS

FIG. 4A, FIG. 4B, and FIG. 4C are explanatory diagrams of processing of an edge extractor.

DESCRIPTION OF THE EMBODIMENTS

Now, embodiments of the present disclosure are described in detail with reference to the accompanying drawings.

First Embodiment

Configuration of Image Reading Apparatus

Figure 1:
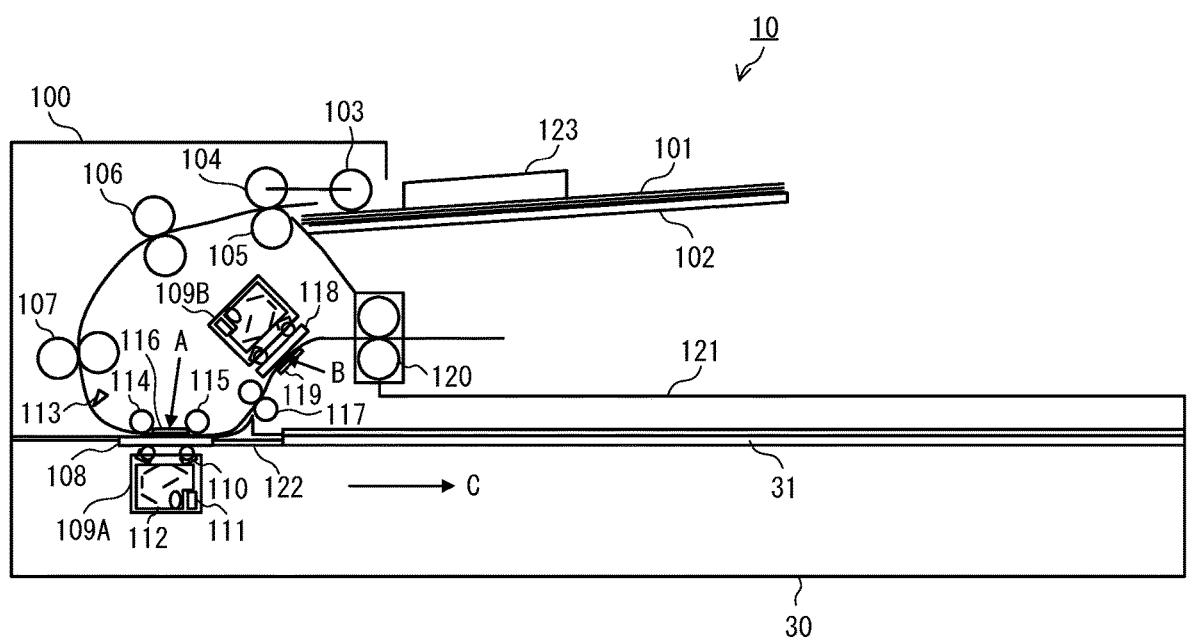
FIG. 1 is a configuration diagram of an image reading apparatus according to a first embodiment of the present disclosure.

FIG. 1 is a configuration diagram of an image reading apparatus according to a first embodiment of the present disclosure. An image reading apparatus 10 includes an ADF 100 and a reader 30. The ADF 100 is configured to convey a sheet-like original 101. The reader 30 is configured to read an image of the original 101 (original image) being conveyed by the ADF 100. The ADF 100 is mounted to a casing of the reader 30 so as to be pivotable with respect to the reader 30 by a hinge (not shown). The reader 30 includes a first reading unit 109A to read an original image on a first surface (front surface) of the original 101. The ADF 100 also includes a second reading unit 109B to read an original image on a second surface (back surface) of the original 101.

The ADF 100 includes an original tray 102, a conveyance path, and a delivery tray 121. The original tray 102 is configured to receive one or more originals 101 to be stacked thereon. The conveyance path is configured to allow conveyance of the original 101. The delivery tray 121 is configured to receive the original 101 to be delivered thereto after being subjected to image reading. A reading position A for reading the original 101 with the first reading unit 109A and a reading position B for reading the original 101 with the second reading unit 109B are provided halfway through the conveyance path. In the first embodiment, the reading position A of the first reading unit 109A is provided on upstream of the reading position B of the second reading unit 109B in a conveying direction of the original 101.

The original tray 102 is provided with side regulating plates 123, which are movable in a direction (width direction) orthogonal to the conveying direction of the original 101. The side regulating plates 123 are configured to regulate a position of the original 101 in the width direction by being brought into abutment against end portions of the original 101 in the width direction. In the first embodiment, a configuration in which two side regulating plates 123 are provided so as to regulate both end portions of the original 101 in the width direction is described. However, a configuration in which one side regulating plate 123 is provided so as to regulate only one end portion of the original 101 in the width direction may be employed. When one side regulating plate 123 is provided, the other end portion of the original 101 in the width direction is regulated by a fixed regulating plate.

The two side regulating plates 123 are configured such that one side regulating plate 123 moves in conjunction with the movement of the other side regulating plate 123 by a linkage mechanism (not shown) provided inside the original tray 102. In the first embodiment, the original 101 has a conveyance center at its center in the width direction. The two side regulating plates 123 are configured to be brought closer to or farther from the center in the width direction. Therefore, the conveyance center of the original 101 matches the center of the original 101 in the width direction. When the side regulating plates 123 moves, a resistance value of a volume resistor (not shown) provided inside the original tray 102 changes in conjunction with the movement. A length of the original 101 placed on the original tray 102 in the width direction can be detected from a voltage value given by a voltage drop in the volume resistor. In short, the configuration including the side regulating plates 123 and the volume resistor functions as a size detector configured to detect a size (length in the width direction) of the original 101. The length in the width direction is referred to as "main scanning size".

The ADF 100 includes a pickup roller 103, separation rollers 104 and 105, pre-conveyance rollers 106, lead rollers 107, lead rollers 117, and delivery rollers 120, which serve as conveyance rotary members, on the conveyance path in the stated order from the upstream side in the conveying direction of the original 101. An original detecting sensor 113 configured to detect the original 101 being conveyed is provided on downstream of the lead rollers 107. The reading position A of the first reading unit 109A is provided between the lead rollers 107 and the lead rollers 117. The reading position B of the second reading unit 109B is provided between the lead rollers 117 and the delivery rollers 120.

The pickup roller 103 is provided so as to freely swing. When the original 101 is to be fed from the original tray 102, the pickup roller 103 is brought into abutment against a surface of the uppermost original 101 of the originals stacked on the original tray 102. When the original 101 is not to be fed, the pickup roller 103 retreats upward so as not to hinder the placement of the original 101 onto the original tray 102. The pickup roller 103 takes in the original 101 on the original tray 102 to convey the original 101 to the separation rollers 104 and 105. The pickup roller 103 is driven to rotate by a motor (not shown).

The pickup roller 103 feeds the original 101 only by a frictional force, and hence a plurality of sheets may be simultaneously fed depending on a friction coefficient of the original 101. Therefore, the separation roller 104 and the separation roller 105 are configured to separate the originals 101 into individual sheets. In the first embodiment, the separation roller 104 is configured to rotate in the direction of conveying the original 101, and the separation roller 105 is configured not to rotate. Through the rotation of only the separation roller 104, the originals 101 are separated into individual sheets.

The separation roller 104 is configured to convey one separated original 101 to the pair of pre-conveyance rollers 106. The pre-conveyance rollers 106 are configured to convey the conveyed original 101 to the pair of lead rollers 107. The lead rollers 107 are configured to convey the conveyed original 101 to the reading position A of the first reading unit 109A. An image on the first surface (front surface) of the original 101 is read by the first reading unit 109A when the original 101 passes through the reading position A.

When the original 101 is read in an unstable posture, a distance between the first reading unit 109A and the original 101 is not stable, and a shadow of the leading edge of the original in the conveying direction cannot be detected with stability. Therefore, a front surface guide plate 116 is arranged at the reading position A. A front surface reading upstream roller 114 is provided on upstream of the front surface guide plate 116, and a front surface reading downstream roller 115 is provided on downstream of the front surface guide plate 116. The first reading unit 109A side of the front surface guide plate 116 is white. The image on the first surface (front surface) of the original 101 is read by the first reading unit 109A when the original 101 passes below the front surface guide plate 116, thereby allowing the image to be read in a stable posture.

The original 101 that has passed through the reading position A of the first reading unit 109A is conveyed to the reading position B of the second reading unit 109B by the pair of lead rollers 117. An image on the second surface (back surface) of the original 101 is read by the second reading unit 109B when the original 101 passes through the reading position B. At the reading position B, a back surface flow reading glass 118 and a back surface guide plate 119 are arranged. The back surface flow reading glass 118 is a transparent member. The second reading unit 109B side of the back surface guide plate 119 is white. The image on the second surface (back surface) of the original 101 is read by the second reading unit 109B when the original 101 passes between the back surface flow reading glass 118 and the back surface guide plate 119.

The original 101 that has passed through the reading position B of the second reading unit 109B is delivered to the delivery tray 121 by the delivery rollers 120. The second reading unit 109B does not perform a reading operation when it is not required to read the original image on the second surface of the original 101.

In the case in which the original 101 is conveyed as described above, when the original detecting sensor 113 detects the original 101, a timing to start the reading operation by the first reading unit 109A and the second reading unit 109B is determined based on a conveying speed of the original 101.

The first reading unit 109A is provided inside the casing of the reader 30. The casing of the reader 30 is configured to support an original table glass 31 and the flow reading glass 108. The ADF 100 is configured to pivot with respect to the reader 30 to be opened and closed with respect to the original table glass 31 and the flow reading glass 108. A white reference plate 122 is provided inside the casing between the original table glass 31 and the flow reading glass 108. The white reference plate 122 serves as a reference member to be read when shading data is acquired. The original 101 is placed on the original table glass 31 with its image formation surface facing the original table glass 31 side. When the image of the original 101 placed on the original table glass 31 is to be read, the first reading unit 109A reads the image of the original 101 line by line while moving in the direction indicated by an arrow C.

The flow reading glass 108 is provided at a position corresponding to the reading position A. The image of the original 101 conveyed by the ADF 100 is read by the first reading unit 109A when the original 101 passes between the flow reading glass 108 and the front surface guide plate 116. In this case, the first reading unit 109A is positioned immediately below the flow reading glass 108 to read the image of the original 101 line by line.

The first reading unit 109A includes a light emitting diode (LED) 110 being a light source, an optical component group 112, and a reading sensor 111. The LED 110 is configured to irradiate the first surface of the original 101 passing through the reading position A with light. Reflected light obtained through reflection of the light on the first surface of the original 101 is guided to the reading sensor 111 by the optical component group 112 to be received by the reading sensor 111. The reading sensor 111 includes a plurality of photoelectric conversion elements arranged side by side in the above-mentioned width direction. The direction (width direction) in which the photoelectric conversion elements are arranged is the main scanning direction. The plurality of photoelectric conversion elements are each configured to receive the reflected light to generate an electric signal obtained by photoelectrically converting the received reflected light. The reading sensor 111 is configured to perform predetermined processing on the electric signals generated by each of the plurality of photoelectric conversion elements, to thereby generate digital pixel data. The pixel data corresponds to data representing a light reception result of the photoelectric conversion element (pixel). That is, the image data representing the original image on the first surface of the original 101 is formed of a plurality of pieces of pixel data.

The second reading unit 109B has the same configuration as that of the first reading unit 109A, and operates in the same manner. That is, the second reading unit 109B includes an LED being a light source, an optical component group, and a reading sensor. The second reading unit 109B is configured to read an original image from the second surface of the original 101 passing through the reading position B through intermediation of the back surface flow reading glass 118. The LED irradiates the second surface of the original 101 with light. Reflected light obtained through the reflection of the light on the second surface of the original 101 is guided to the reading sensor by the optical component group to be received by the reading sensor. The reading sensor generates pixel data based on the received reflected light.

The image reading apparatus 10 having such a configuration can read an original image in two modes of a "flow reading mode" and a "fixed reading mode". In the flow reading mode, an original image is read from the original 101 conveyed by the ADF 100. In the fixed reading mode, an original image is read from the original 101 placed on the original table glass 31. In the first embodiment, skew feeding correction of the original 101 in the flow reading mode is described, and hence description of the fixed reading mode is omitted.

In the flow reading mode, as described above, the original 101 is conveyed from the original tray 102 onto the flow reading glass 108 which corresponds to the reading position A of the first reading unit 109A. When the flow reading mode is started, the first reading unit 109A moves to a position immediately below the flow reading glass 108. The first reading unit 109A reads the original image on the first surface line by line from the original 101 passing above the flow reading glass 108.

When only the original image on one surface (first surface) of the original 101 is read, the original 101 that has passed above the flow reading glass 108 is delivered to the delivery tray 121 by the lead rollers 117 and the delivery rollers 120. At this time, the original 101 passes through the reading position B of the second reading unit 109B, but the second reading unit 109B does not perform the reading operation.

Figure 2:
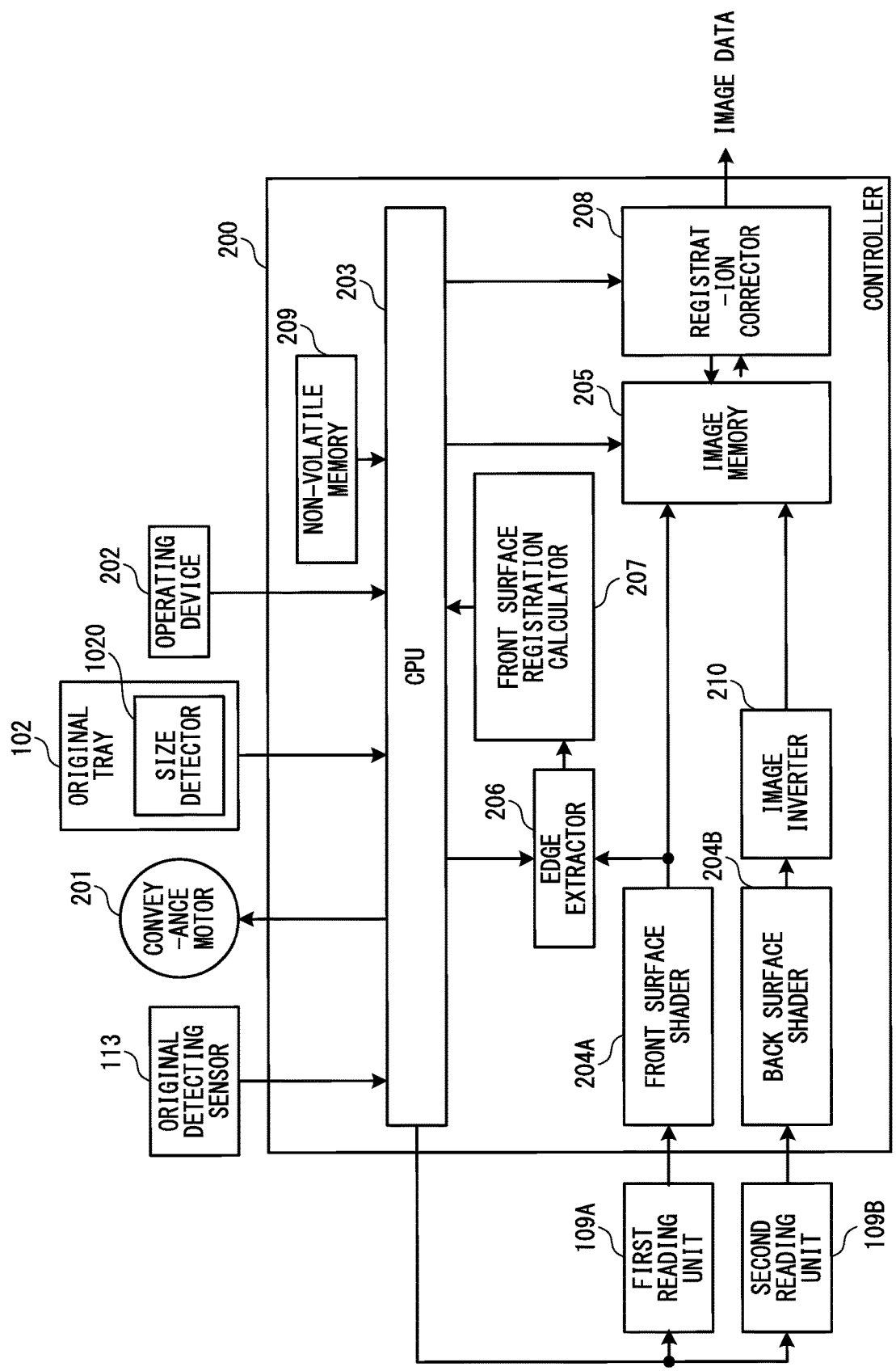
FIG. 2 is an explanatory diagram of a controller.

When the original images on both surfaces of the original 101 are read, the original image on the second surface of the original 101 is read by the second reading unit 109B while the original 101 passes through the reading position B of the second reading unit 109B. The second reading unit 109B reads the original image on the second surface line by line from the original 101 passing through the conveyance path.
Controller FIG. 2 is an explanatory diagram of a controller configured to control an operation of the image reading apparatus 10 having the configuration described above. A controller 200 is formed of at least one application specific integrated circuit (ASIC), and executes each of functions described below. It is noted that functions achieved by the ASIC may be achieved by a CPU(s) or an MPU(s).

The controller 200 in the first embodiment is provided in the image reading apparatus 10. The controller 200 is connected to a conveyance motor 201 and an operating device 202 in addition to the original tray 102, the first reading unit 109A, the second reading unit 109B, and the original detecting sensor 113. The conveyance motor 201 is a drive source configured to drive to rotate the abovementioned rollers configured to convey the original 101. The operating device 202 includes an input interface and a display. The input interface is to be operated by a user to receive various instructions and input data from the user. The display is configured to notify the user. The user can use the operating device 202 to set, for example, a resolution in the main scanning direction to be used when the image of the original 101 is read.

The controller 200 includes a central processing unit (CPU) 203 and a non—volatile memory 209. The CPU 203 is configured to control an operation of each of the components of the image reading apparatus 10 by executing a predetermined computer program stored in the non-volatile memory 209. Instructions and input data are input to the CPU 203 from the operating device 202. The CPU 203 starts operation control of the image reading apparatus 10 in response to an instruction acquired from the operating device 202. In addition, the controller 200 includes a front surface shader 204A, a back surface shader 204B, an image memory 205, an edge extractor 206, a front surface registration calculator 207, a registration corrector 208, and an image inverter 210.

When an image reading instruction is acquired from the operating device 202, the CPU 203 drives the conveyance motor 201 to start to convey the original 101, and starts to drive the first reading unit 109A and the second reading unit 109B. When a drive instruction is received from the CPU 203, the first reading unit 109A and the second reading unit 109B perform image reading processing on the original 101. The first reading unit 109A and the second reading unit 109B transmit 8-bit (0 to 255) pixel data, which is a reading result, to the controller 200. The pixel data exhibits a larger numerical value as an intensity of the reflected light is higher. A level of this numerical value is hereinafter expressed as "luminance value". In addition, when the image reading instruction is acquired from the operating device 202, the CPU 203 acquires information representing the main scanning size from a size detector 1020 of the original tray 102.

The controller 200 starts to acquire image data from the first reading unit 109A at a predetermined timing between a timing at which the original detecting sensor 113 detects the leading edge of the original 101 in the conveying direction and a timing at which the leading edge reaches the reading position A. The controller 200 also starts to acquire image data from the second reading unit 109B at a predetermined timing between a timing at which the original detecting sensor 113 detects the leading edge of the original 101 in the conveying direction and a timing at which the leading edge reaches the reading position B.

The reading sensor 111 in the first embodiment includes, in the main scanning direction, 7,488 photoelectric conversion elements (pixels) configured to receive light of each of three colors of red (R), green (G), and blue (B).

The pixel data output from the first reading unit 109A is input to the front surface shader 204A. The pixel data output from the second reading unit 109B is input to the back surface shader 204B. The front surface shader 204A and the back surface shader 204B perform shading correction based on the input pixel data. Through the shading correction, nonuniformity of a light amount of the LED 110 in the main scanning direction and an influence of sensitivity unevenness of each pixel of the reading sensor 111 are corrected.

The pixel data on the first surface and the pixel data on the second surface, which have been subjected to the shading correction, are stored in the image memory 205 at a predetermined timing. The image data representing the image on the second surface passes through the image inverter 210 before being stored in the image memory 205. The second reading unit 109B in the first embodiment has the same configuration as that of the first reading unit 109A. The second reading unit 109B is mounted to the ADF 100 in a vertically inverted form with the same orientation in the main scanning direction compared with the first reading unit 109A. Therefore, the image data on the second reading unit 109B becomes an image inverted in the main scanning direction with respect to the image data on the first reading unit 109A. The image inverter 210 inverts the image data on the second surface in the main scanning direction before the image data is stored in the image memory 205, to thereby match its orientation with that of the image data on the first surface.

Figure 3:
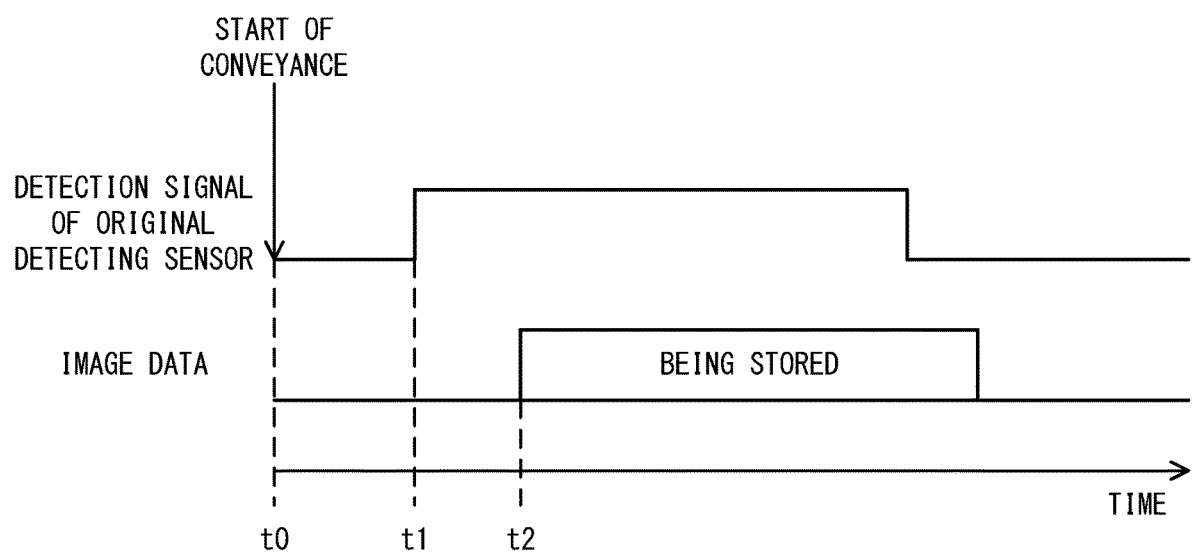
FIG. 3 is an explanatory diagram of a timing to store image data in an image memory.

FIG. 3 is an explanatory diagram of a timing to store the pixel data in the image memory 205. When a predetermined time (t1) has elapsed since the conveyance of the original 101 is started (t0), the leading edge of the original 101 reaches a detection position of the original detecting sensor 113. When the leading edge of the original 101 reaches the detection position of the original detecting sensor 113, a detection signal indicating a detection result is turned on (transition from Low to Hi in FIG. 3). This detection signal is input to the CPU 203. The CPU 203 starts to store the pixel data in the image memory 205 at a predetermined timing (t2) in a period after the detection signal of the original detecting sensor 113 is turned on and before the original 101 reaches the reading position A.
Edge Extraction In the first embodiment, the edge extractor 206 acquires the pixel data at the same timing (t2 in FIG. 3) as a timing at which the pixel data is stored in the image memory 205.

FIG. 4A, FIG. 4B, and FIG. 4C are explanatory diagrams of processing of the edge extractor 206.

FIG. 4A is an illustration of a part of the image data representing the image of an original. The edge extractor 206 acquires the pixel data from a timing before the original 101 reaches the reading position A. Therefore, the image data includes the image of the original 101 and an image (image of the front surface guide plate 116) on upstream of the shadow of the leading edge of the original 101.

The edge extractor 206 performs binarization processing on the pixel data forming the image data with a region of 9 pixels, specifically, 3 pixels in the main scanning direction by 3 pixels in the sub-scanning direction being used as one block. In the first embodiment, a pixel position in the main scanning direction is set as n (1≤n≤7486), and a pixel position in the sub-scanning direction is set as m (1≤m≤11998). The luminance value of each pixel is px (x=0 to 8).

The edge extractor 206 calculates a difference between a maximum value pmax and a minimum value pmin of the luminance values of 9 pixels in one block as illustrated in FIG. 4B.

As indicated by a point A in FIG. 4A, in a white region in which 9 pixels are in the front surface guide plate 116, all the 9 pixels are white pixels. Therefore, the difference between the maximum value pmax and the minimum value pmin has a small value. As indicated by a point B in FIG. 4A, at a boundary between the front surface guide plate 116 and the shadow (gray) of the leading edge of the original 101, white pixels and gray pixels are mixed in the 9 pixels. Therefore, the difference between the maximum value pmax and the minimum value pmin becomes larger.

When the difference between the maximum value pmax and the minimum value pmin is larger than a predetermined threshold value pth, a pixel relevant thereto becomes a pixel (edge pixel) of an edge portion of the original 101. Specifically, a central pixel (pixel at the coordinates (n, m)) of one block that satisfies Expression 1 given below is determined as the edge pixel. The edge extractor 206 sequentially performs such determination processing on each pixel included in the image data.

$$p\text{max} - p\text{min} \geq p\text{th} \qquad \text{(Expression 1)}$$

FIG. 4C is an illustration of image data (binarized data) obtained by binarizing the image data illustrated in FIG. 4A with the threshold value pth (14 in FIGS. 4A to 4C). Pixels illustrated in white are edge pixels that satisfy Expression 1 given above. In this manner, the shadow of a leading edge portion of the original 101 is determined as an edge.

Registration Information

Figure 5:
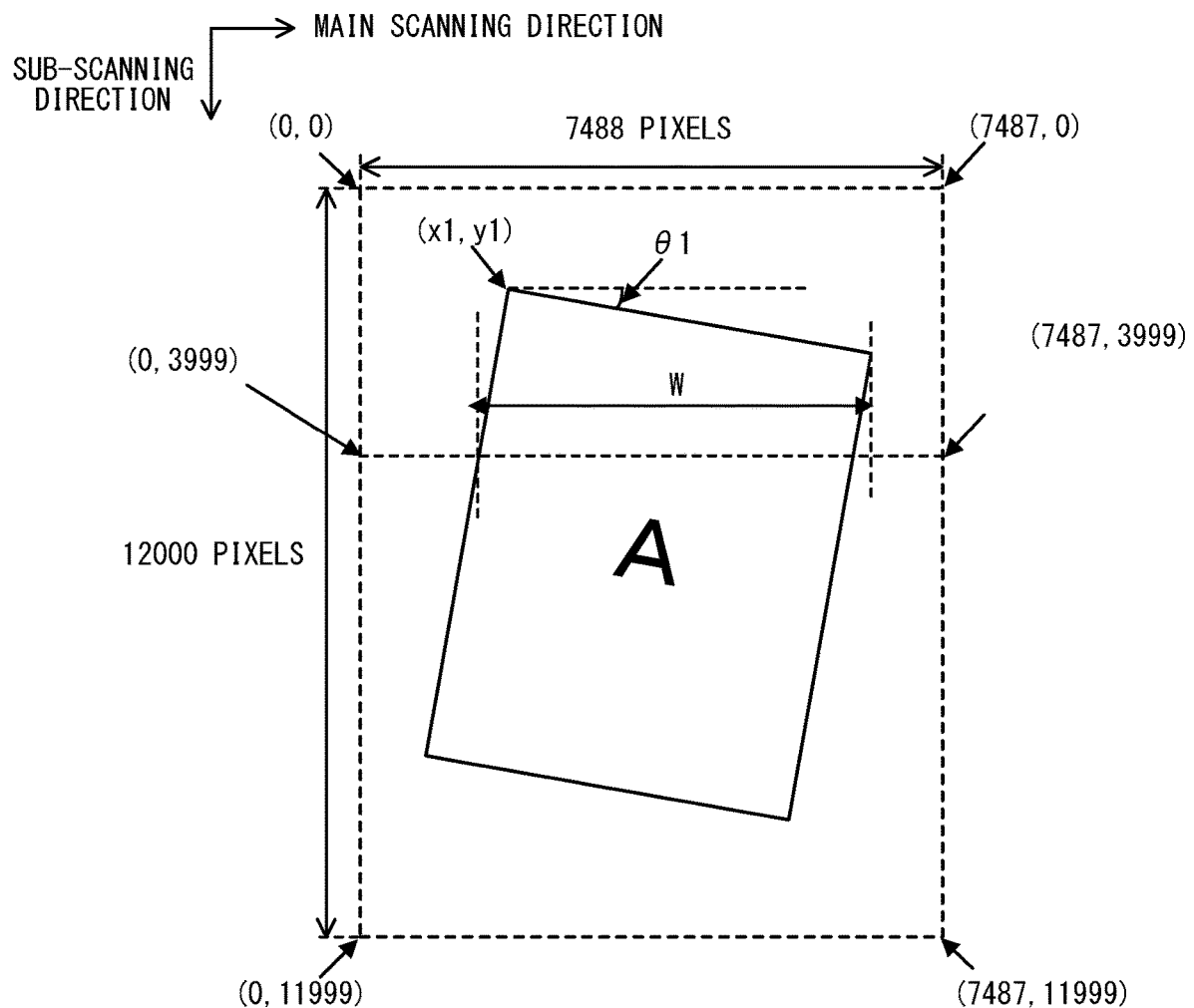
FIG. 5 is an explanatory diagram of a method of calculating registration information.

The front surface registration calculator 207 acquires the binarized data from the edge extractor 206. The front surface registration calculator 207 calculates registration information on the original 101 from the binarized data. FIG. 5 is an explanatory diagram of a method of calculating the registration information.

The pixel data is input to the edge extractor 206 from the timing before the original 101 reaches the reading position A, and hence the front surface registration calculator 207 acquires the binarized data within a range indicated by the dotted lines in FIG. 5. In the first embodiment, the front surface registration calculator 207 acquires, for example, the binarized data on the pixel data having an x-coordinate of from 0 to 7487 and a y-coordinate of from 0 to 3999 among the pixel data within a range from coordinates (0, 0) to coordinates (7487, 11999).

The front surface registration calculator 207 in the first embodiment calculates, based on the binarized data, an original leading edge angle θ1 of the image on the first surface (front surface), a direction (sign) of an angle, upper left coordinates (x1, y1), and a width W of the original image in the main scanning direction in the acquired binarized data, and transmits the calculated information to the CPU 203.

Specifically, the front surface registration calculator 207 calculates the width W based on the shadow represented by the acquired binarized data (shadow of a side at the leading edge of the original and shadow of a side at a side edge adjacent to the side at the leading edge). More specifically, the front surface registration calculator 207 calculates, as the width W, a length from the shadow at the left end to the shadow at the right end in the acquired binarized data in the main scanning direction.

The front surface registration calculator 207 also performs, for example, linear approximation on pixel data in a main scanning pixel width (pixel data corresponding to the shadow of the side at the leading edge of the original 101), which is described later, to thereby detect the side at the leading edge of the original 101 and calculate the original leading edge angle θ1 and the angle direction (sign) based on the detection result.

Then, the front surface registration calculator 207 calculates, as the upper left coordinates (x1, y1), an intersection point of, for example, a linearly approximated straight line and a perpendicular line passing through a position of a pixel corresponding to the shadow of the side at the side edge of the original 101 at a position having a y-coordinate of a predetermined value among a plurality of perpendicular lines to the linearly approximated straight line. The predetermined value is set at a position at which a pixel corresponding to the shadow of the side at the side edge of the original 101 is located and which exerts no influence of breakage, bend, or fold at both ends of the original.

For example, the predetermined value may be set at a position on a trailing edge side (y-coordinate of between 3000 and 3999) in the binarized data acquired by the front surface registration calculator 207. In the first embodiment, the sign of the angle is a positive direction (+ direction) for a skew feeding direction being upward right with respect to the main scanning direction, and a negative direction (− direction) for a skew feeding direction being downward right with respect to the main scanning direction. The original leading edge angle θ1, the angle direction (sign), the upper left coordinates (x1, y1), and the width W are the registration information in the first embodiment.

Registration Correction

The CPU 203 transmits the original leading edge angle θ1, the angle direction, the upper left coordinates (x1, y1), and the width W, which have been acquired from the front surface registration calculator 207, to the registration corrector 208. The registration corrector 208 uses the original leading edge angle θ1, the angle direction, the upper left coordinates (x1, y1), and the width W to rotate the image data so as to reduce the original leading edge angle θ1, to thereby correct (reduce) an inclination of the image. That is, the registration corrector 208 uses the original leading edge angle θ1, the angle direction, the upper left coordinates (x1, y1), and the width W to read the image data on the first surface (front surface) stored in the image memory 205 while performing registration correction on the image data. Specifically, the registration correction is performed when, for example, the image data is read from the image memory 205 along the side at the leading edge of the original image (along the direction of the original leading edge angle θ1)

from the upper left coordinates (x1, y1). The registration correction may be performed by, for example, general affine transformation.

Figure 6A:
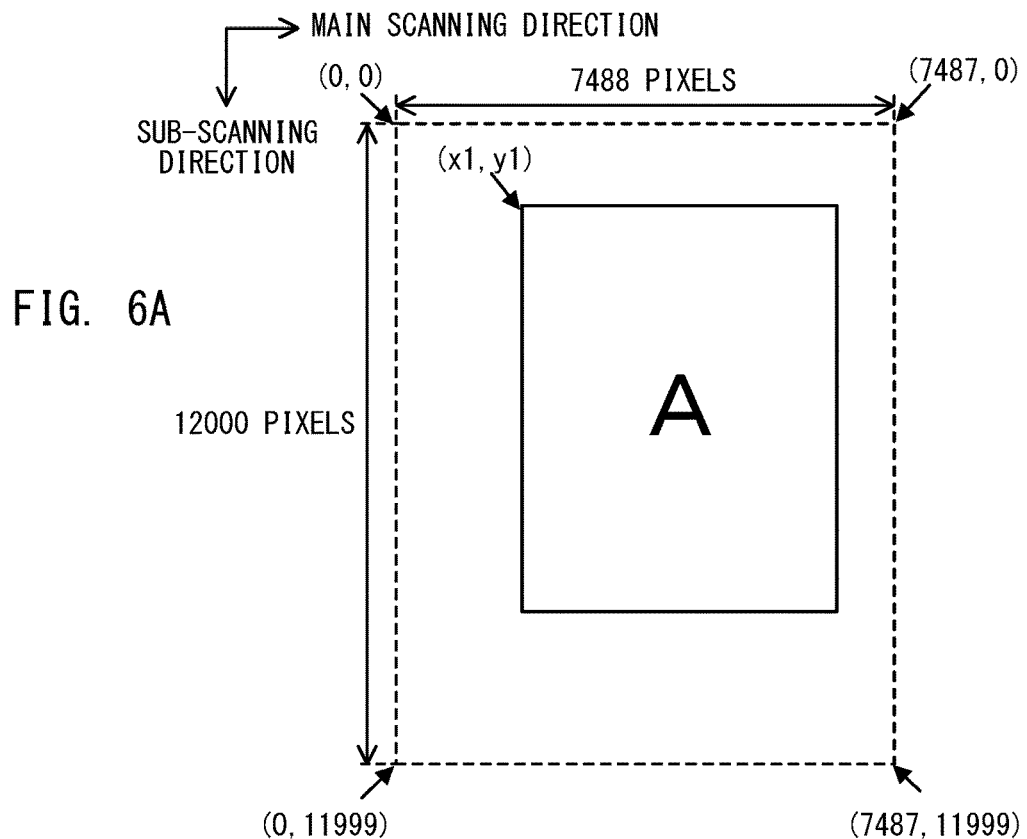
FIG. 6A and FIG. 6B are explanatory diagrams of registration correction.
Figure 6B:
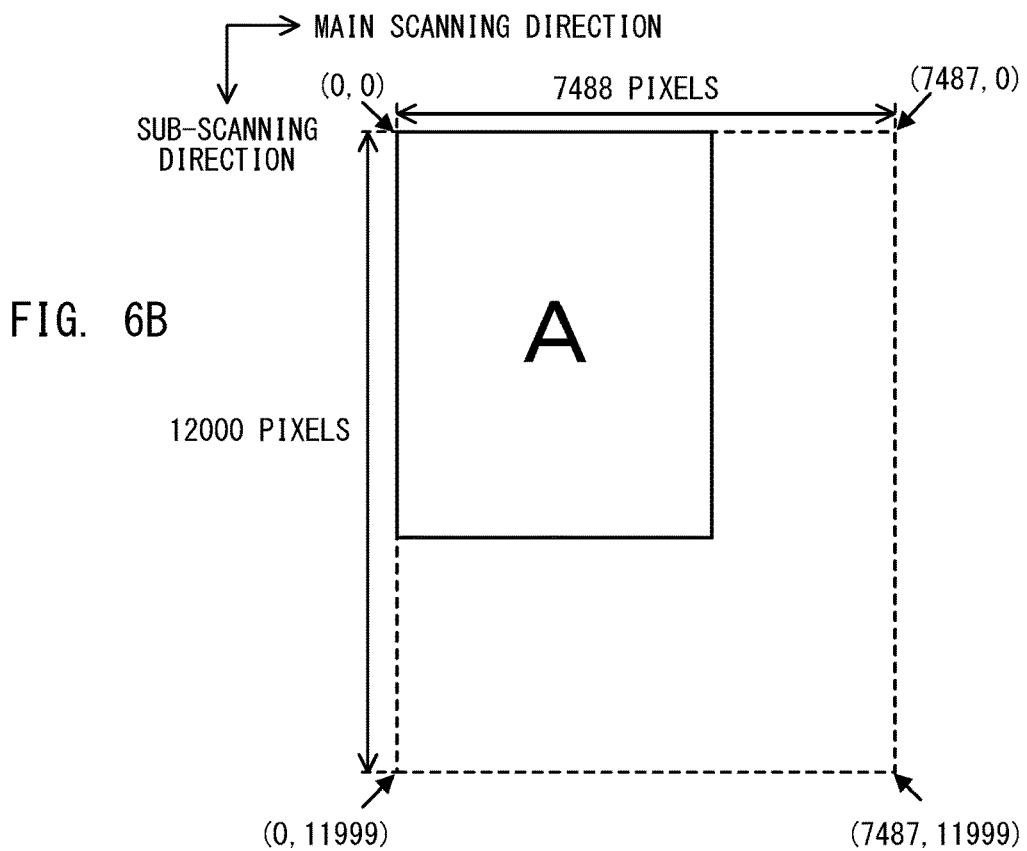

FIG. 6A and FIG. 6B are explanatory diagrams of the registration correction in the first embodiment. FIG. 6A is an illustration of an exemplary case in which the image data illustrated in FIG. 5 has been subjected to the rotation correction based on the original leading edge angle θ1 and the sign of the angle. The original leading edge angle θ1 indicates a skew feeding amount, and the skew feeding correction is performed by the rotation correction. FIG. 6B is an illustration of an exemplary case in which the image data subjected to the rotation correction has been subjected to parallel displacement correction in the main scanning direction and the sub-scanning direction based on the upper left coordinates (x1, y1). Through the registration correction, the image data on the first surface (front surface) has the upper left coordinates at the position (0, 0) and is subjected to the skew feeding correction.

Main Scanning Pixel Width

When the original leading edge angle θ1 is to be calculated from the image on the first surface (front surface), the front surface registration calculator 207 selects a pixel width in the main scanning direction (main scanning pixel width), which is an effective region (edge detection region) to be used for calculating the original leading edge angle θ1.

When breakage or fold has occurred at at least one of both ends of the side at the leading edge of the original 101 in the main scanning direction, it is difficult to accurately calculate the original leading edge angle θ1 from the image data including such a region. The breakage or fold at both ends of the original may occur when the stapled original bundle is separated into individual sheets for conveyance by the ADF. Therefore, when the original leading edge angle θ1 is to be calculated, ineffective regions are set at the both end portions in the main scanning direction depending on the size in the main scanning direction (main scanning size) of the original 101 detected by the size detector 1020 of the original tray 102. When the ineffective region has a fixed value, the main scanning pixel width to be used when the original leading edge angle θ1 is calculated from the image data on a small-size original, for example, a business card, becomes shorter than that of a normal-size original. This causes a decrease in accuracy of the original leading edge angle θ1. Through the setting of the ineffective region depending on the main scanning size, a sufficient main scanning pixel width is secured even for a small-size original, and the decrease in accuracy of the original leading edge angle θ1 is prevented. In general, a small-size sheet, for example, a business card, is less likely to be stapled than an A4-size original. In the first embodiment, the ineffective region given in the case with the main scanning size being equal to or larger than a predetermined size is set larger than the ineffective region given in the case with the main scanning size being smaller than the predetermined size.

Figure 7A:
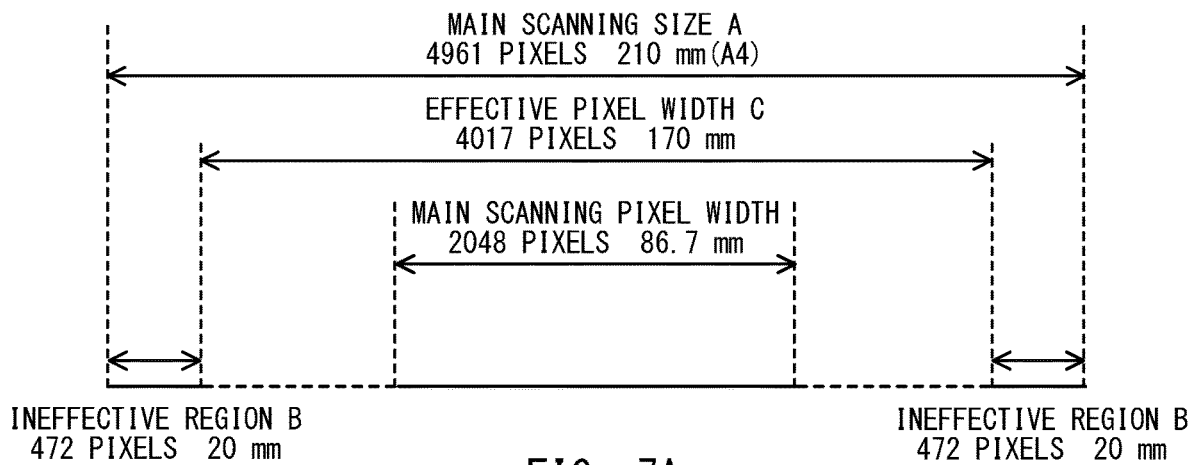
FIG. 7A, FIG. 7B, and FIG. 7C are explanatory diagrams of a main scanning pixel width.
Figure 7B:
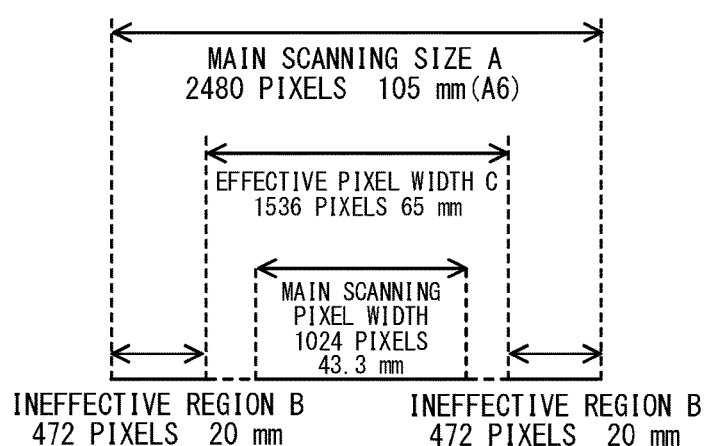
Figure 7C:
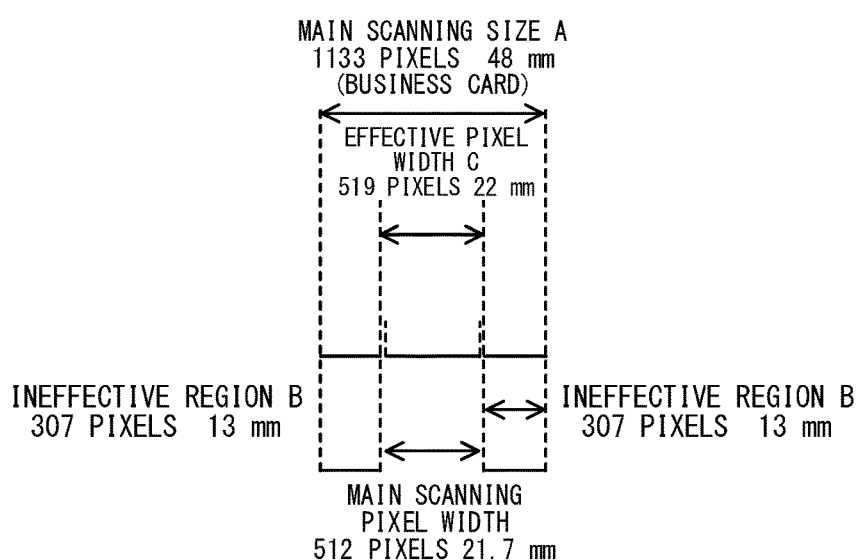

FIG. 7A, FIG. 7B, and FIG. 7C are explanatory diagrams of the main scanning pixel width. In FIG. 7A, FIG. 7B, and FIG. 7C, the main scanning size detected on the original tray 102 is set as the main scanning size A, the ineffective regions set at the both end portions in the main scanning direction are set as ineffective regions B, and pixels obtained by excluding the ineffective regions B from the main scanning size A are set to have an effective pixel width C. FIG. 7A is an illustration of an example of the main scanning pixel width (edge detection region) of the A4-size original. FIG. 7B is an illustration of an example of the main scanning pixel width (edge detection region) of an A6-size original.

FIG. 7C is an illustration of an example of the main scanning pixel width (edge detection region) of a business-card-size original.

The ineffective region B is variable depending on an original size (main scanning size). In the first embodiment, when the main scanning size A is equal to or larger than a predetermined number of pixels, specifically in this example, equal to or larger than 1,457 pixels, the ineffective region B is set to 472 pixels, and when the main scanning size A is smaller than 1,457 pixels, the ineffective region B is set to 307 pixels. When, for example, the originals in a stapled state are separated, the separated original often has fold or breakage caused in its corner portions.

In the first embodiment, a range in which such fold or breakage may occur is assumed to be 472 pixels, and the ineffective region B is set to 472 pixels. It is also considered that an original having a main scanning size smaller than 1,457 pixels is less frequently stapled, and the range in which fold or breakage may occur in the original is smaller than an original having a main scanning size equal to or larger than 1,457 pixels. Therefore, the ineffective region B of the original having a main scanning size smaller than 1,457 pixels is set to 307 pixels. The ineffective region B of the original having a main scanning size smaller than 1,457 pixels may be set to 0 pixels. That is, the ineffective region given in the case with the main scanning size being smaller than 1,457 pixels is smaller than the ineffective region given in the case with the main scanning size being equal to or larger than 1,457 pixels.

The effective pixel width C is calculated by Expression 2 given below.

(Effective pixel width $C$)=(main scanning size $A$)−(ineffective region $B$)×2  (Expression 2)

As illustrated in FIG. 7A, the A4-size original has a main scanning size of 4,961 pixels (210 mm). Therefore, the ineffective region B has 472 pixels. The effective pixel width C is 4,017 pixels as expressed below.

(Effective pixel width $C$)=(4,961 pixels)−(472 pixels)×2=(4,017 pixels)

The front surface registration calculator 207 selects, based on the effective pixel width C, the main scanning pixel width to be used for calculating the original leading edge angle θ1 from among a plurality of kinds of pixel width candidates prepared in advance. In the first embodiment, the main scanning pixel width is selected from three kinds of pixel width candidates of 512 pixels, 1,024 pixels, and 2,048 pixels. The three kinds of pixel width candidates are prepared based on sizes of the original that can be conveyed by the ADF 100. The front surface registration calculator 207 compares the effective pixel width C with a plurality of kinds of pixel width candidates prepared in advance to set, as the main scanning pixel width, the largest pixel width candidate that is equal to or smaller than the effective pixel width C. The effective pixel width C of the A4-size original is 4,017 pixels, and hence the main scanning pixel width to be used for calculating the original leading edge angle θ1 is 2,048 pixels.

As illustrated in FIG. 7B, the A6-size original has a main scanning size of 2,480 pixels (105 mm). Therefore, the ineffective region B has 472 pixels. The effective pixel width C is 1,536 pixels as expressed below. The effective pixel width C is 1,536 pixels, and hence the main scanning pixel width to be used for calculating the original leading edge angle θ1 is 1,024 pixels.

(Effective pixel width $C$)=(2,480 pixels)−(472 pixels)×2=(1,536 pixels)

As illustrated in FIG. 7C, the business-card-size original has a main scanning size of 1,133 pixels (48 mm). Therefore, the ineffective region B has 307 pixels. The effective pixel width C is 519 pixels as expressed below. The effective pixel width C is 519 pixels, and hence the main scanning pixel width to be used for calculating the original leading edge angle θ1 is 512 pixels.

(Effective pixel width C)=(1,133 pixels)−(307 pixels)×2=(519 pixels)

The front surface registration calculator 207 performs, for example, the linear approximation on the pixel data in the determined main scanning pixel width (pixel data corresponding to the shadow of the side at the leading edge of the original 101). Specifically, for example, when the main scanning pixel width is determined to be 512 pixels, the front surface registration calculator 207 determines the position of the pixel in the main scanning direction to be used for the linear approximation so that the position of the central pixel of the calculated width W in the main scanning direction matches the position of the 256th (or 257th) pixel in the main scanning direction from the pixel at the left end of the determined main scanning pixel width.

Then, the front surface registration calculator 207 performs the linear approximation on the pixel data at the determined position in the main scanning direction (pixel data corresponding to the shadow of the side at the leading edge of the original 101) to detect the side at the leading edge of the original 101 and calculate the original leading edge angle θ1 and the angle direction (sign) based on the detection result. Further, the front surface registration calculator 207 calculates, as the upper left coordinates (x1, y1), the intersection point of, for example, a linearly approximated straight line and a perpendicular line passing through the position of the pixel corresponding to the shadow of the side at the side edge of the original 101 at the position having the y-coordinate of the predetermined value among the plurality of perpendicular lines to the linearly approximated straight line.

In the first embodiment, the largest pixel width candidate that is equal to or smaller than the effective pixel width C is set as the main scanning pixel width, but the present disclosure is not limited thereto. For example, the effective pixel width C may be set as the main scanning pixel width.

Skew Feeding Correction Processing

Figure 8:
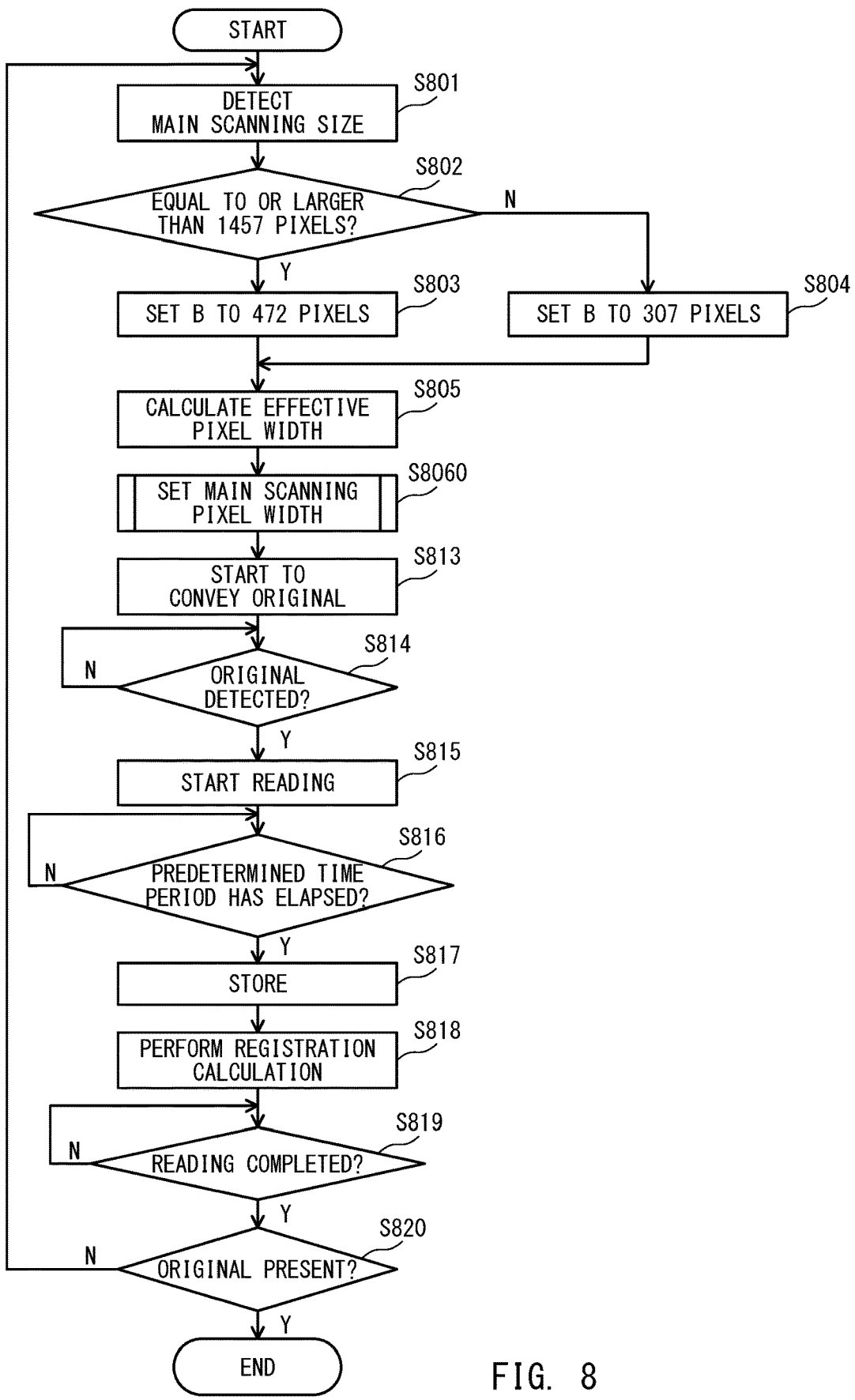
FIG. 8 is a flow chart for illustrating image reading processing.
Figure 9:
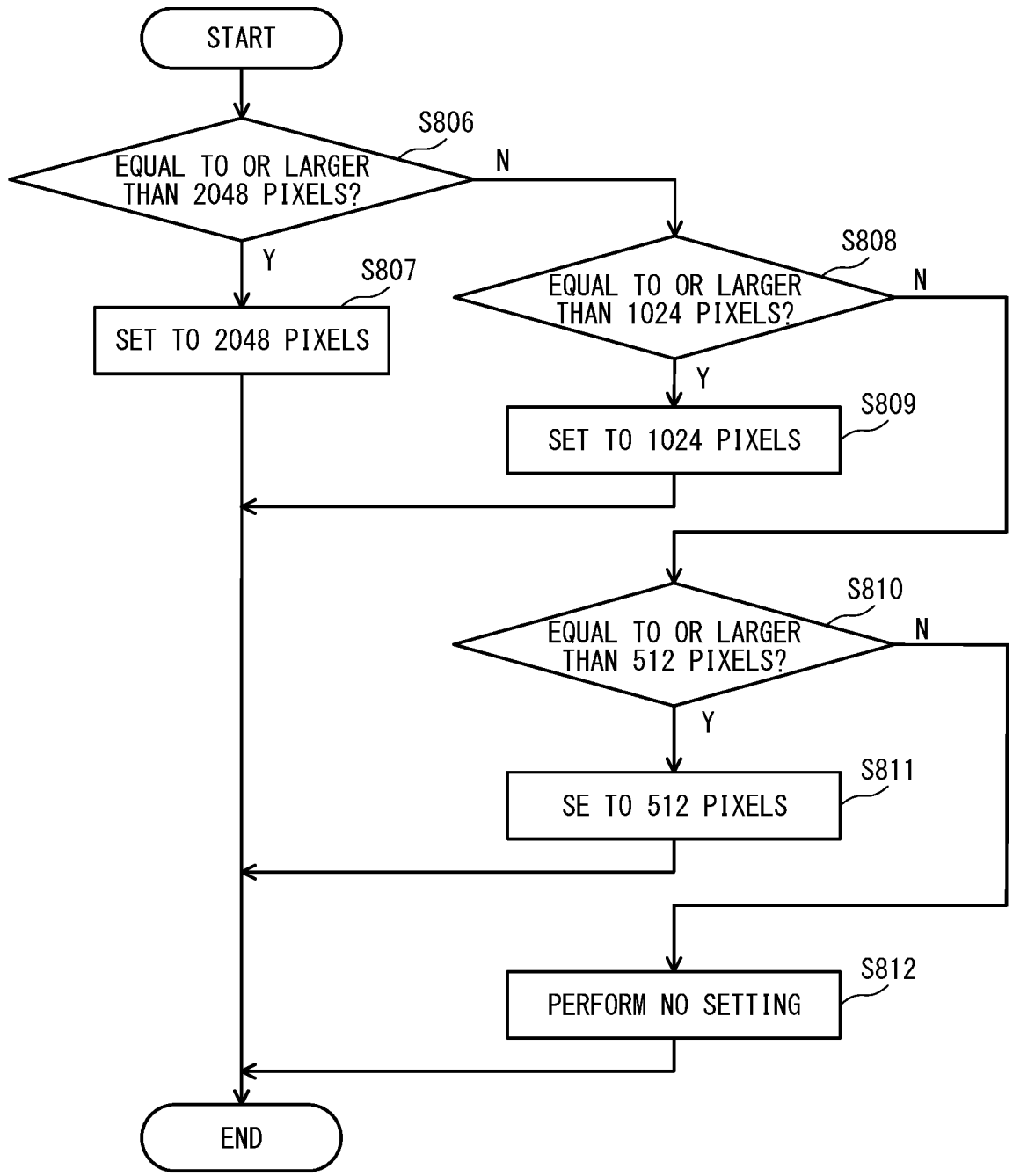
FIG. 9 is a flow chart for illustrating the image reading processing.

FIG. 8 and FIG. 9 are flow charts for illustrating image reading processing involving skew feeding processing in the first embodiment. This processing is performed by the controller 200 in response to an image reading instruction input from the operating device 202 to the controller 200.

The user uses the two side regulating plates 123 to regulate the original 101 placed on the original tray 102 in the main scanning direction. Thus, the size detector 1020 of the original tray 102 detects the main scanning size A of the original 101. The CPU 203 acquires information representing the main scanning size A of the original 101 from the size detector 1020 (Step S801).

The CPU 203 causes the front surface registration calculator 207 to set the ineffective regions B based on the main scanning size A. When the main scanning size A is equal to or larger than 1,457 pixels (Step S802: Y), the front surface registration calculator 207 sets the ineffective region B to 472 pixels (Step S803). When the main scanning size A is smaller than 1,457 pixels (Step S802: N), the front surface registration calculator 207 sets the ineffective region B to 307 pixels (Step S804).

The CPU 203 that has set the ineffective region B causes the front surface registration calculator 207 to calculate the effective pixel width C (Step S805). For example, when the main scanning size A is 4,961 pixels (210 mm), the ineffective region B is set to 472 pixels, and the effective pixel width C is 4,017 pixels. When the main scanning size A is 2,480 pixels (105 mm), the ineffective region B is set to 472 pixels, and the effective pixel width C is 1,536 pixels. When the main scanning size A is 1,133 pixels (48 mm), the ineffective region B is set to 307 pixels, and the effective pixel width C is 519 pixels.

The CPU 203 causes the front surface registration calculator 207 to set, based on the effective pixel width C, the main scanning pixel width to be used for calculating the original leading edge angle θ1 (Step S8060). The front surface registration calculator 207 compares the effective pixel width C with a plurality of kinds of pixel width candidates (2,048 pixels, 1,024 pixels, and 512 pixels) to set, as the main scanning pixel width, the largest pixel width candidate that is equal to or smaller than the effective pixel width C. FIG. 9 is a flow chart for illustrating the processing of Step S8060 to be executed by the CPU 203.

When the effective pixel width C is equal to or larger than 2,048 pixels (Step S806: Y), the front surface registration calculator 207 sets the main scanning pixel width to 2,048 pixels (Step S807).

When the effective pixel width C is smaller than 2,048 pixels (Step S806: N) and is equal to or larger than 1,024 pixels (Step S808: Y), the front surface registration calculator 207 sets the main scanning pixel width to 1,024 pixels (Step S809).

When the effective pixel width C is smaller than 1,024 pixels (Step S808: N) and is equal to or larger than 512 pixels (Step S810: Y), the front surface registration calculator 207 sets the main scanning pixel width to 512 pixels (Step S811).

When the effective pixel width C is smaller than 512 pixels being the smallest pixel width candidate (Step S810: N), the front surface registration calculator 207 does not set the main scanning pixel width. This is because the main scanning pixel width for accurately calculating the original leading edge angle θ1 cannot be ensured. In this case, the original leading edge angle θ1 is set to 0° (Step S812). The CPU 203 also displays information indicating that the registration correction has not been performed on the display of the operating device 202 to notify the user.

After the main scanning pixel width is set, the CPU 203 drives and controls the conveyance motor 201 to start to convey the originals 101 placed on the original tray 102 one by one (Step S813). The CPU 203 waits until the original detecting sensor 113 detects the original 101 after the start of original conveyance (Step S814: N). When the original detecting sensor 113 detects the original 101 (Step S814: Y), the CPU 203 causes the first reading unit 109A to start the image reading processing for the original 101 (Step S815).

When a predetermined time period, specifically in this example, a time period of (t2−t1) in FIG. 3, has elapsed since the start of the reading processing (Step S816), the CPU 203 starts to store the image data acquired from the first reading unit 109A in the image memory 205 (Step S817). At this time, the image data is also transmitted to the edge extractor 206. The edge extractor 206 starts to generate binarized data based on the acquired image data. In addition, registration calculation is performed by the front surface registration calculator 207 to calculate the original leading edge angle θ1, the sign of the angle, the upper left coordinates (X1, Y1), and the width W. At this time, the front surface registration calculator 207 calculates the original leading edge angle θ1 based on the pixels of the main scanning pixel width set in the processing of Step S8060. The front surface registration calculator 207 transmits a result of the registration calculation to the CPU 203 (Step S818).

The CPU 203 causes the registration corrector 208 to read the image data from the image memory 205 depending on the result of the registration calculation to output the image data (Step S819: N). Thus, the skew feeding correction is performed on the image data. When the registration corrector 208 completes the output of the image data from the image memory 205, the image reading of one original 101 is completed (Step S819: Y). When the image reading of one original 101 is completed, the CPU 203 determines whether or not the next original is placed on the original tray 102 (Step S820). When the next original is placed (Step S820: Y), the CPU 203 repeatedly executes the processing of Step S801 and the subsequent steps until no more next original is present. When the next original is not placed (Step S820: N), the CPU 203 brings the image reading processing to an end.

The image reading apparatus 10 according to the first embodiment described above performs the skew feeding correction by rotating the image data and correcting the position of the image data. The main scanning pixel width for calculating the skew feeding amount is set depending on the size of the original, and hence it is possible to perform the skew feeding correction with high accuracy even for a small-size original, for example, a business card.

In the first embodiment described above, the ineffective regions B is set to two kinds of 472 pixels and 307 pixels. This is merely an example of the ineffective regions B, and the ineffective region B may be set from more options. For example, an option of the ineffective region B may be prepared for each size of the original that can be conveyed by the ADF 100. In regard to the main scanning pixel width, options more than three kinds of 2,048 pixels, 1,024 pixels, and 512 pixels may be prepared. For example, an option of a main scanning pixel width may be prepared for each size of the original that can be conveyed by the ADF 100.

The first embodiment of the present disclosure has been described above, but the present disclosure is not limited to the first embodiment described above. The skew feeding correction based on a reading result obtained by the first reading unit 109A has been described above, but the skew feeding correction can be similarly performed on a reading result obtained by the second reading unit 109B. The effects described in the first embodiment of the present disclosure are merely given as the most preferred effects to be produced from the present disclosure, and the effects of the present disclosure are not limited to those described in the first embodiment of the present disclosure.

In the first embodiment, the main scanning size A is detected based on the detection result obtained by the size detector 1020 of the original tray 102, but the present disclosure is not limited thereto. For example, the calculated width W may be used as the main scanning size A.

Second Embodiment

Configuration of Image Forming Apparatus

In the following description, a description of a part of an image reading apparatus having the same configuration as that of the image reading apparatus according to the first embodiment is omitted.

Figure 10:
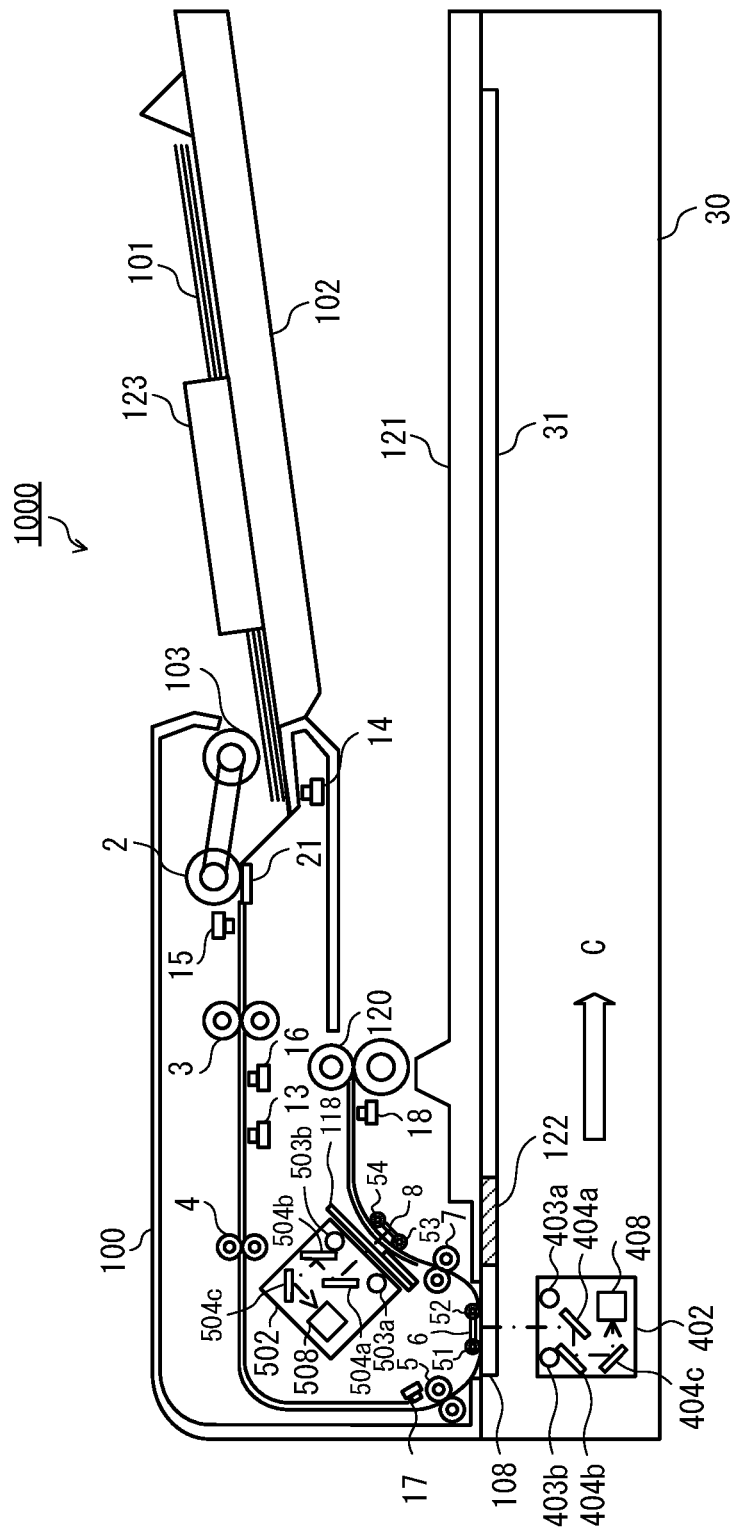
FIG. 10 is a configuration diagram of an image reading apparatus according to a second embodiment of the present disclosure.

FIG. 10 is a configuration diagram of an image reading apparatus according to a second embodiment of the present disclosure. An image reading apparatus 1000 includes the ADF 100 configured to convey a sheet-like original 101 to be read and the reader 30 configured to read the image of the original 101 conveyed by the ADF 100. The ADF 100 is mounted to the casing of the reader 30 so as to be pivotable with respect to the reader 30 by the hinge (not shown). The casing of the reader 30 is configured to support the original table glass 31 and the flow reading glass 108. The pivoting enables the ADF 100 to be opened and closed with respect to the original table glass 31 and the flow reading glass 108. The ADF 100 includes the original tray 102 configured to receive one or more originals 101 to be stacked thereon, the conveyance path configured to convey the original 101, and the delivery tray 121 configured to receive the read original 101 to be delivered thereto.

The original tray 102 is provided with the side regulating plates 123, which are movable in the main scanning direction (width direction) orthogonal to the conveying direction of the original 101. The side regulating plates 123 are configured to regulate the position of the original 101 in the width direction by being brought into abutment against the end portions of the original 101 in the width direction. In the second embodiment, a configuration in which two side regulating plates 123 are provided so as to regulate the both end portions of the original 101 in the width direction is described. However, a configuration in which one side regulating plate 123 is provided so as to regulate only one end portion of the original 101 in the width direction may be employed. When one side regulating plate 123 is provided, the other end portion of the original 101 in the width direction is regulated by the fixed regulating plate.

The two side regulating plates 123 are configured such that one side regulating plate 123 moves in conjunction with the movement of the other side regulating plate 123 by the linkage mechanism (not shown) provided inside the original tray 102. In the second embodiment, the original 101 has the conveyance center at its center in the width direction. The two side regulating plates 123 are configured to be brought closer to or farther from the center in the width direction. Therefore, the conveyance center of the original 101 matches the position of the center of the original 101 in the width direction irrespective of the size of the original 101.

The ADF 100 includes the pickup roller 103, a separation roller 2, a separation pad 21, drawing rollers 3, conveyance rollers 4, lead rollers 5, lead rollers 7, and the delivery rollers 120, on the conveyance path in the stated order from the upstream side in the conveying direction of the original 101.

The original tray 102 is provided with an original presence detecting sensor 14 configured to detect presence or absence of the original 101. The pickup roller 103 is provided so as to freely swing. When the original 101 is to be fed from the original tray 102, the pickup roller 103 is caused to fall on the surface of the uppermost original 101 and rotate. When the original 101 is not to be fed, the pickup roller 103 retreats upward so as not to hinder the placement of the original 101 onto the original tray 102. The pickup roller 103 is caused to fall on the surface of the original 101 and rotate, to thereby take in the uppermost original 101 on the original tray 102 to convey the original 101 to the separation roller 2. The separation roller 2 is configured to separate the originals 101 into individual sheets by a separation nip portion formed between the separation roller 2 and the separation pad 21. Such separation of the originals 101 is a known separation technique.

The originals 101 separated into individual sheets by the separation roller 2 and the separation pad 21 are each conveyed to the conveyance rollers 4 by the drawing rollers 3. The lead rollers 5 is configured to convey the original 101 conveyed by the conveyance rollers 4 to a reading position (upper portion of the flow reading glass 108) of a first reading unit 402.

The flow reading glass 108 is provided at the reading position of the first reading unit 402 to be used when the image of the original conveyed by the ADF 100 is to be read. A white front surface guide plate 6 is provided at a position facing the first reading unit 402 across the flow reading glass 108. A front surface reading upstream roller 51 is provided on upstream of the front surface guide plate 6, and a front surface reading downstream roller 52 is provided on downstream of the front surface guide plate 6. The original 101 is conveyed between the flow reading glass 108 and the front surface guide plate 6 by the front surface reading upstream roller 51. The first reading unit 402 is configured to read the image on the first surface (front surface) from the original 101 passing between the flow reading glass 108 and the front surface guide plate 6 through intermediation of the flow reading glass 108.

The original 101 that has passed through the reading position of the first reading unit 402 is conveyed to the reading position of a second reading unit 502 by the front surface reading downstream roller 52. The lead rollers 7 are provided between the reading position of the first reading unit 402 and the reading position of the second reading unit 502. A white back surface guide plate 8 is provided at a position facing the second reading unit 502 across the back surface flow reading glass 118. A back surface reading upstream roller 53 is provided on upstream of the back surface guide plate 8, and a back surface reading downstream roller 54 is provided on downstream of the back surface guide plate 8. The original 101 is conveyed between the back surface flow reading glass 118 and the back surface guide plate 8 by the back surface reading upstream roller 53. The second reading unit 502 is configured to read the image on the second surface (back surface) of the original 101 passing between the back surface flow reading glass 118 and the back surface guide plate 8 through intermediation of the back surface flow reading glass 118.

The original 101 that has passed through the reading position of the second reading unit 502 is conveyed by the back surface reading downstream roller 54 to the delivery rollers 120 provided on the downstream side. The delivery rollers 120 are configured to deliver the original 101 to the delivery tray 121. When the original image on one surface of the original 101 is to be read, the first reading unit 402 reads the original image on the first surface of the original 101, and the second reading unit 502 does not operate. When the original images on both surfaces of the original 101 are to be read, the first reading unit 402 reads the original image on the first surface of the original 101, and the second reading unit 502 reads the original image on the second surface of the original 101.

The processing for reading an image while conveying the original 101 through use of the ADF 100 as described above is called "flow reading".

The original 101 is placed on the original table glass 31 with its image formation surface facing the original table glass 31 side. In this case, the first reading unit 402 reads the image of the original placed on the original table glass 31 line by line while moving in the direction indicated by the arrow C at a constant speed. The processing for reading the image of the original on the original table glass 31 is called "fixed reading".

The first reading unit 402 includes LEDs 403a and 403b serving as light sources, reflective mirrors 404a to 404c, and a reading sensor 408. The LEDs 403a and 403b are configured to irradiate the original 101 passing above the flow reading glass 108 with light. Reflected light, which is light used for the irradiation and reflected from the original 101, is reflected by the reflective mirrors 404a to 404c to be received by the reading sensor 408. The reading sensor 408 includes a plurality of photoelectric conversion elements arranged side by side in a direction orthogonal to the direction indicated by the arrow C. The reading sensor 408 is configured to perform predetermined processing on the electric signals obtained by photoelectrically converting the reflected light received by the plurality of photoelectric conversion elements, to thereby generate image data. This image data represents the image on the first surface of the original 101. The image data is generated each time the image is read by one line. The direction in which the photoelectric conversion elements are arranged is the main scanning direction. The direction indicated by the arrow C is the sub-scanning direction.

The second reading unit 502 has the same configuration as that of the first reading unit 402, and is configured to read the original image on the second surface of the original 101 by the same operation. That is, the second reading unit 502 includes LEDs 503a and 503b serving as light sources, reflective mirrors 504a to 504c, and a reading sensor 508. The LEDs 503a and 503b are configured to irradiate the original 101 passing between the back surface flow reading glass 118 and the back surface guide plate 8 with light. Reflected light, which is light used for the irradiation and reflected from the original 101, is reflected by the reflective mirrors 504a to 504c to be received by the reading sensor 508. The reading sensor 508 is configured to perform predetermined processing on the electric signals obtained by photoelectrically converting the received reflected light by the plurality of photoelectric conversion elements, to thereby generate image data. The image data is generated each time the image is read by one line. This image data represents the image on the second surface of the original 101.

The white reference plate 122 is a member to be used during shading processing and serves as a white reference. The shading processing using the white reference plate 122 is performed before the start of the image reading in both cases of the fixed reading and the flow reading.

A separation sensor 15, a drawing sensor 16, an original width detecting sensor 13, a lead sensor 17, and a delivery sensor 18 are provided on the conveyance path in the stated order from the upstream side in the conveying direction of the original 101. Timings at which the first reading unit 402 and the second reading unit 502 start reading operations are determined depending on the detection result obtained by the lead sensor 17. A plurality of original width detecting sensors 13 are arranged side by side at positions different in the main scanning direction orthogonal to the conveying direction. The length in the main scanning direction (original width) of the original 101 being conveyed on the conveyance path is detected depending on the detection result obtained by the original width detecting sensor 13.

Figure 11:
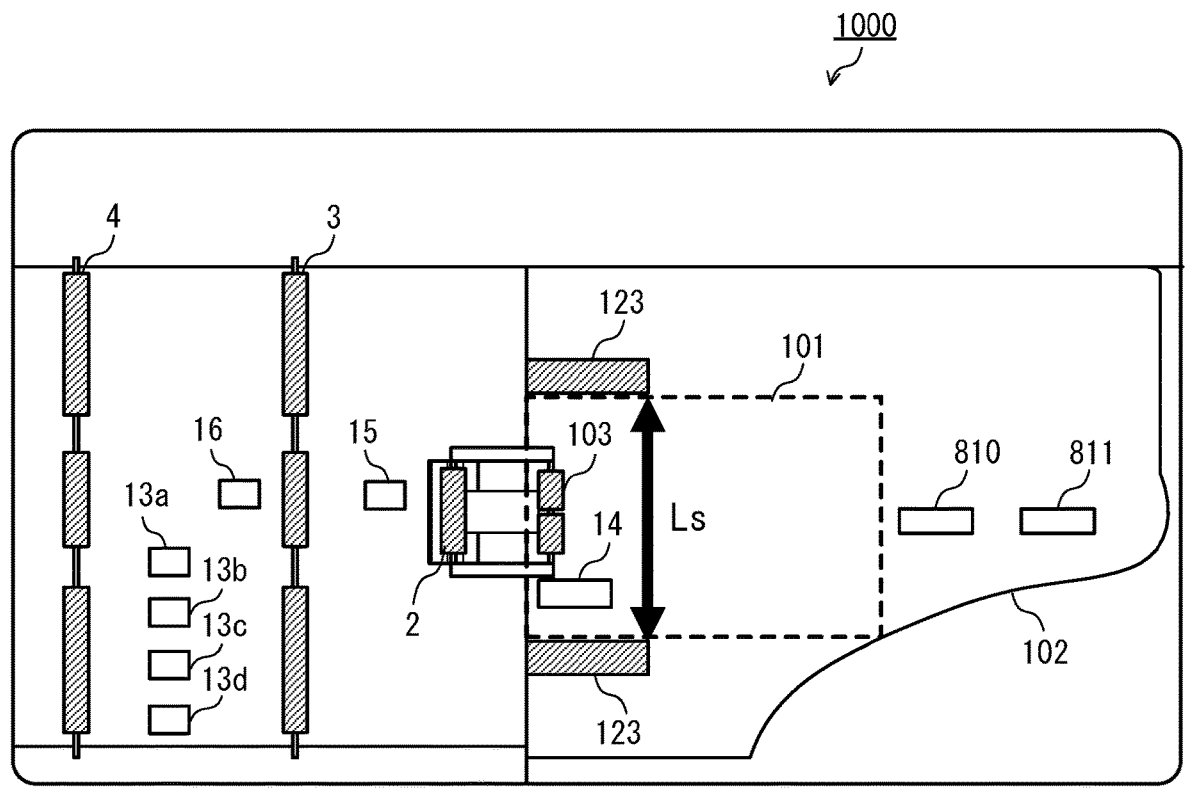
FIG. 11 is a top cross-sectional view of an ADF.

FIG. 11 is a top cross-sectional view of the ADF 100. In FIG. 11, the A4-size original 101 is placed on the original tray 102. The original tray 102 is provided with original length detecting sensors 810 and 811 configured to detect a length of the placed original 101 (original length) in the conveying direction (sub-scanning direction). Each of the original length detecting sensors 810 and 811 detects the presence or absence of the original 101 placed on the original tray 102, to thereby detect a rough size of the original length of the original 101. The original 101 is also regulated in the width direction by the two side regulating plates 123. A distance between the two side regulating plates 123 is an original width Ls of the original 101.

In regard to the original width detecting sensor 13, as described above, a plurality of original width detecting sensors 13a, 13b, 13c, and 13d are arranged at the positions different in the main scanning direction. The original width of the original 101 being conveyed can be measured depending on detection states of the original 101 by the original width detecting sensors 13a, 13b, 13c, and 13d. For example, when the original width detecting sensors 13a and 13b have detected the original 101, and the original width detecting sensors 13c and 13d have not detected the original 101, the original width of the original 101 is determined as follows. That is, the original width of the original 101 is determined to be equal to or larger than twice a distance from the conveyance center of the original 101 to the position of the original width detecting sensor 13b and smaller than twice a distance from the conveyance center of the original 101 to the position of the original width detecting sensor 13c.

Control System

Figure 12:
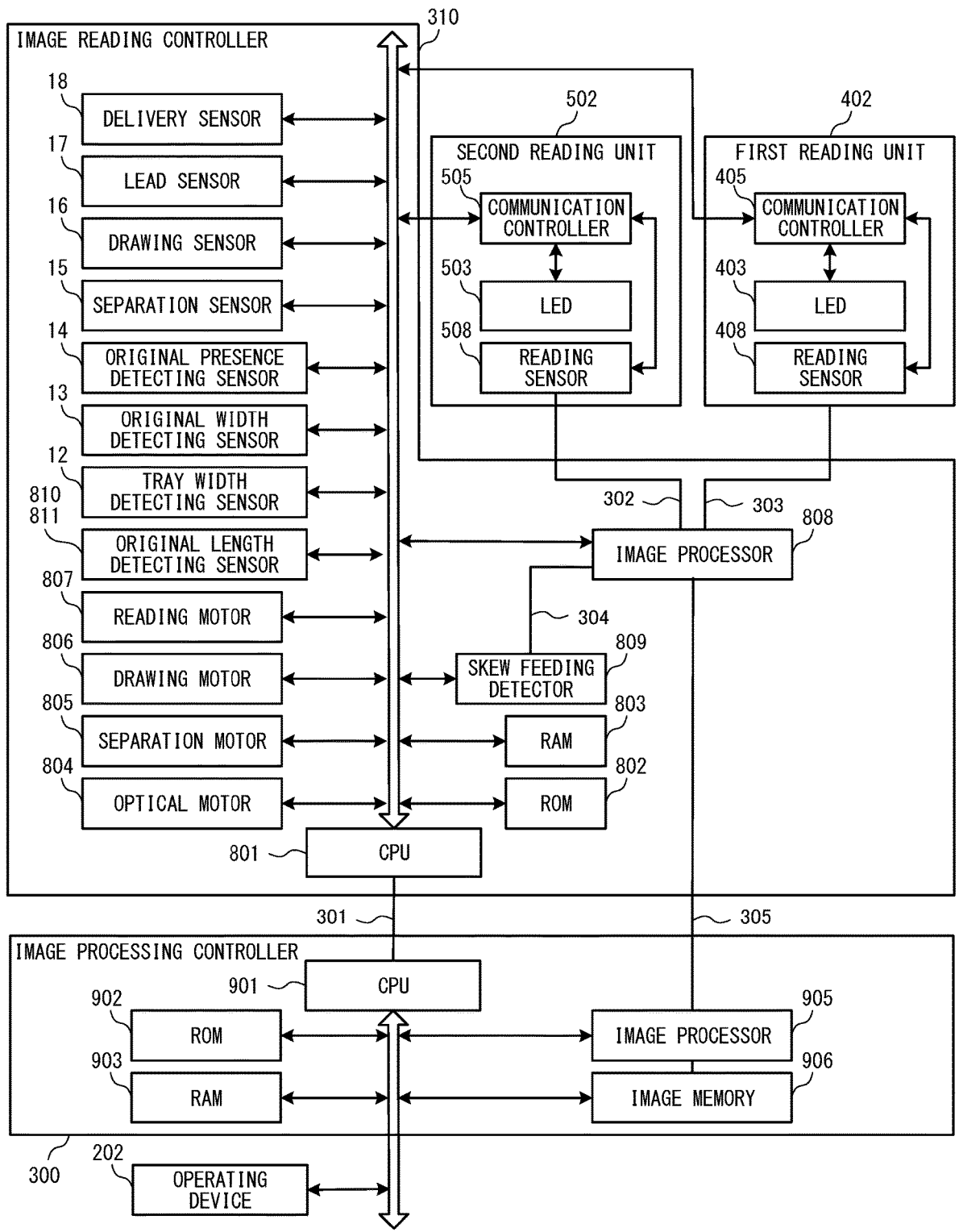
FIG. 12 is a configuration diagram of a control system.

FIG. 12 is a configuration diagram of a control system configured to control an operation of the image reading apparatus 1000. A control system in the second embodiment includes an image reading controller 310 provided in the image reading apparatus 1000 and an image processing controller 300. For example, when the image reading apparatus 1000 is combined with an image forming apparatus to form a copying machine or a multifunction peripheral, the image processing controller 300 is provided in the image forming apparatus. The image processing controller 300 may be included in the image reading apparatus 1000.

An operation of the image reading controller 310 is controlled by a CPU 801, a read only memory (ROM) 802, and a random access memory (RAM) 803. The CPU 801 is configured to control an operation of each component of the image reading apparatus 1000 by executing a computer program stored in the ROM 802. In that case, the RAM 803 provides a work area, and various kinds of data are temporarily stored in the work area.

In order to implement an original conveyance function, the CPU 801 is connected to a separation motor 805, a drawing motor 806, and a reading motor 807. The separation motor 805 is configured to drive to rotate the pickup roller 103 and the separation roller 2 under control of the CPU 801. The drawing motor 806 is configured to drive to rotate the drawing rollers 3 and the conveyance rollers 4 under the control of the CPU 801. The reading motor 807 is configured to drive to rotate the lead rollers 5, the front surface reading upstream roller 51, the front surface reading downstream roller 52, the lead rollers 7, the back surface reading upstream roller 53, the back surface reading downstream roller 54, and the delivery rollers 120 under the control of the CPU 801.

The CPU 801 is connected to the original presence detecting sensor 14, the separation sensor 15, the drawing sensor 16, the lead sensor 17, and the delivery sensor 18. In addition, the CPU 801 is connected to a tray width detecting sensor 12 and the original width detecting sensor 13. The tray width detecting sensor 12 is configured to detect the original width Ls of the original 101 placed on the original tray 102. The tray width detecting sensor 12 and the original width detecting sensor 13 form a size detector configured to detect the original width in the width direction (main scanning direction). The tray width detecting sensor 12 detects the distance between the two side regulating plates 123, to thereby detect the original width Ls of the original 101 placed on the original tray 102.

The CPU 801 is connected to an optical motor 804 configured to move the first reading unit 402 in the direction indicated by the arrow C. The optical motor 804, the separation motor 805, the drawing motor 806, and the reading motor 807 are pulse motors. The CPU 801 controls the operation of those motors while counting a driving pulse number, to thereby control the number of revolutions of each of the motors.

For example, the CPU 801 counts the driving pulse number of the separation motor 805 from when the drawing sensor 16 detects the original 101 (is turned on) until when the drawing sensor 16 no longer detects the original 101 (is turned off) during the original conveyance. A conveyance amount of the original 101 is measured based on the driving pulse number of the separation motor 805 and the advance amount (gear ratio) per pulse of a gear that transmits a drive force of the separation motor 805 to the separation roller 2. Therefore, the CPU 801 can measure the original length of the original 101 being conveyed based on the count value of the driving pulse number of the separation motor 805. The CPU 801 also counts the driving pulse number of the separation motor 805 from a state in which the drawing sensor 16 does not detect the original 101 (is turned off) to a state in which the drawing sensor 16 detects the original 101 (is turned on) during the original conveyance. This enables the CPU 801 to measure a distance (sheet gap) between the continuously conveyed originals 101.

The CPU 801 can determine the original length of the original 101 placed on the original tray 102 based on the detection results obtained by the original length detecting sensors 810 and 811. For example, it is assumed that a distance from a leading edge position of the original 101 placed on the original tray 102 to the original length detecting sensor 810 is 220 mm, and a distance from the leading edge position of the original 101 to the original length detecting sensor 811 is 330 mm. When the original length detecting sensors 810 and 811 both do not detect the original (are both turned off), the CPU 801 determines that the original length of the original 101 is less than 220 mm. When the original length detecting sensor 810 detects the original (is turned on), and the original length detecting sensor 811 does not detect the original (is turned off), the CPU 801 determines that the original length of the original 101 is equal to or longer than 220 mm and shorter than 330 mm. When the original length detecting sensors 810 and 811 both detect the original (are both turned on), the CPU 801 determines that the original length of the original 101 is equal to or longer than 330 mm.

As described above, the CPU 801 can measure the original length of the original 101 being conveyed and the original length of the original 101 placed on the original tray 102. The CPU 801 can also measure the original width by a width detector. The CPU 801 can determine the original size of the original to be read based on the measured original length and the measured original width.

In order to implement an image reading function, the CPU 801 is connected to the second reading unit 502. The second reading unit 502 includes a communication controller 505 in addition to the LEDs 503a and 503b (hereinafter referred to simply as "LED 503") and the reading sensor 508. The CPU 801 controls light emission of the LED 503 through intermediation of the communication controller 505 to cause the reading sensor 508 to output the image data. The first reading unit 402 includes a communication controller 405 in addition to the LEDs 403a and 403b (hereinafter referred to simply as "LED 403") and the reading sensor 408. The CPU 801 controls light emission of the LED 403 through intermediation of the communication controller 405 to cause the reading sensor 408 to output the image data.

In order to perform processing on the read image, the CPU 801 is connected to an image processor 808 and a skew feeding detector 809. The image data output from the reading sensor 508 is input to the image processor 808 through an image communication line 302. The image data output from the reading sensor 408 is input to the image processor 808 through an image communication line 303. In response to an instruction given by the CPU 801, the image processor 808 performs, on the acquired image data, image processing including the skew feeding correction for correcting the inclination of the image, the shading processing, and various kinds of filter processing. That is, the image processor 808 has the functions of the front surface shader 204A, the back surface shader 204B, the image inverter 210, the image memory 205, and the registration corrector 208 in the first embodiment.

The image processor 808 transmits the processed image data to the image processing controller 300 through an image communication line 305. It is noted that functions achieved by the CPU 801 and/or processor 808 may be achieved by at least one processor.

The skew feeding detector 809 performs skew feeding detection processing for detecting, based on the image data, the skew feeding amount of the original 101 (inclination amount of the read image with respect to the main scanning direction). That is, the skew feeding detector 809 has the functions of the edge extractor 206 and the front surface registration calculator 207 in the first embodiment.

The CPU 801 is connected to the image processing controller 300 by a communication line 301. The CPU 801 transmits a vertical synchronizing signal serving as a reference of the leading edge of the image represented by the image data and a horizontal synchronizing signal indicating a head of the leading edge of the pixels of one line, to the image processing controller 300 through the communication line 301 in synchronization with a timing to read the original image.

The image processing controller 300 includes a CPU 901, a ROM 902, a RAM 903, an image processor 905, and an image memory 906. The image processing controller 300 is connected to the operating device 202. The CPU 901 is configured to control an overall operation of the image reading apparatus 1000 by executing a computer program stored in the ROM 902. In that case, the RAM 903 provides a work area, and various kinds of data are temporarily stored in the work area. The CPU 901 can communicate with the image reading controller 310 (CPU 801) through the communication line 301.

The image processor 905 is configured to acquire the image data from the image processor 808 of the image reading controller 310 through the image communication line 305. The image processor 905 is further configured to perform predetermined image processing including color determination on the acquired image data and store the processed image data in the image memory 906.

The operating device 202 is formed of a combination of an input interface and an output interface. The input interface is to be operated by the user to receive various instructions and input data. The output interface is configured to provide various kinds of information to the user through a screen. The CPU 901 receives input of instructions and input data from the operating device 202. The operating device 202 displays screens, for example, an input screen, a setting screen, and a state display screen in response to an instruction given by the CPU 901.

Image Reading Processing

Figure 13:
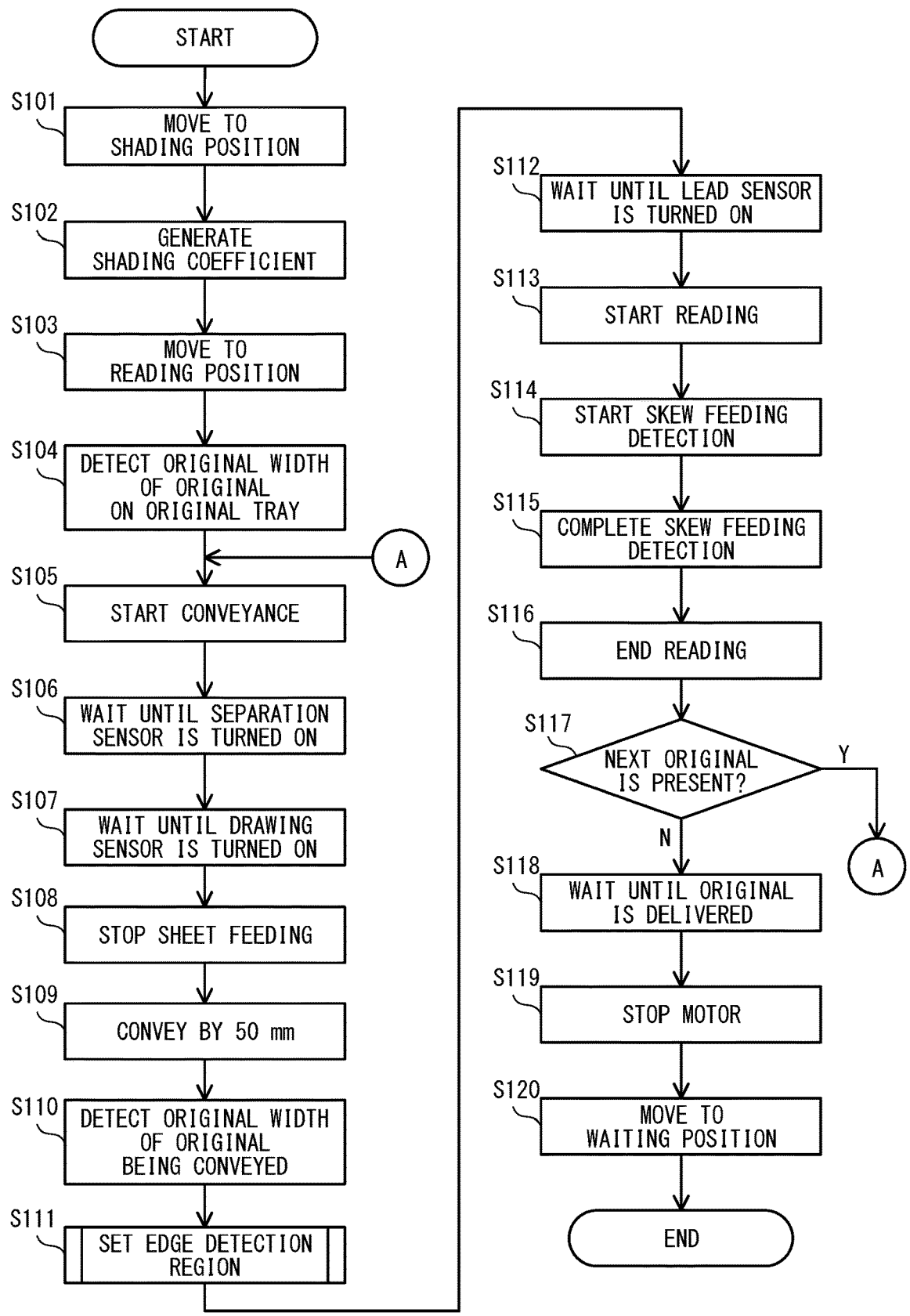
FIG. 13 is a flow chart for illustrating image reading processing.

Reading processing for the original image to be performed by the above-mentioned image reading apparatus 1000 through the flow reading is described. FIG. 13 is a flow chart for illustrating the image reading processing. This processing starts when the CPU 901 receives an instruction to start the image reading from the operating device 202. When the instruction to start the image reading is received, the CPU 901 instructs the CPU 801 to read the image.

When the instruction from the CPU 901 is received, the CPU 801 causes the optical motor 804 to move the first reading unit 402 to a shading position (Step S101). The shading position is a position for the first reading unit 402 to read the white reference plate 122. The CPU 801 causes the first reading unit 402 to read the white reference plate 122, and generates a shading coefficient based on a result of the reading (Step S102). The CPU 801 performs known shading correction through use of the shading coefficient during the reading of the original image.

The CPU 801 that has generated the shading coefficient causes the optical motor 804 to move the first reading unit 402 to the position (reading position) immediately below the flow reading glass 108 in order to read the original image from the original 101 conveyed by the ADF 100 (Step S103). The CPU 801 detects the original width Ls of the original 101 placed on the original tray 102 depending on the detection result obtained by the tray width detecting sensor 12 (Step S104). After that, the CPU 801 drives the separation motor 805, the drawing motor 806, and the reading motor 807 to start the conveyance of the original 101 (Step S105).

When the conveyance of the original 101 is started, the CPU 801 waits until the separation sensor 15 detects the original 101 (is turned on) (Step S106). When the separation sensor 15 does not detect the original 101 within a predetermined time period, the CPU 801 may determine that a jam has occurred and stop the conveyance of the original 101. When the separation sensor 15 detects the original 101, the CPU 801 waits until the drawing sensor 16 detects the original 101 (is turned on) (Step S107). When the drawing sensor 16 detects the original 101, the CPU 801 stops the separation motor 805 to stop the sheet feeding (Step S108). The CPU 801 stops the separation motor 805 to prevent the next original from being continuously fed. Only the separation motor 805 is stopped, while the drawing motor 806 and the reading motor 807 continue to operate. Therefore, the conveyance of the original 101 that has already been fed is not stopped.

The CPU 801 conveys the original 101 by a predetermined distance, specifically in this example, 50 mm, from the position at which the drawing sensor 16 has detected the original 101 (Step S109). The CPU 801 controls a conveyance distance of the original 101 based on the driving pulse number of the drawing motor 806. When the CPU 801 has a built-in timer, the conveyance distance of the original 101 may be controlled through use of the conveying time period and conveying speed of the original 101. The original 101 reaches the detection position of the original width detecting sensor 13 by being conveyed by 50 mm. The predetermined distance by which the original 101 is conveyed is set depending on the distance between the position at which the drawing sensor 16 detects the original 101 and the position of the original width detecting sensor 13. In the second embodiment, the distance between the drawing sensor 16 and the original width detecting sensor 13 is about 30 mm.

While the original 101 is conveyed by 50 mm, the CPU 801 detects the original width of the original 101 being conveyed based on the detection result obtained by the original width detecting sensor 13 (Step S110). The original width detecting sensors 13a to 13d in the second embodiment are each formed of a flag-type sensor and configured to switch the state (on or off) of a photo interrupter when the conveyed original 101 turns off the flag. In addition to the flag-type sensor, the original width detecting sensor 13 may be formed of a photo interrupter having the state (on or off) switched by the conveyed original 101 blocking an optical path. The CPU 801 stores the on or off state of each of the original width detecting sensors 13a to 13d in the RAM 803 as width information.

For example, when the A4-size original 101 is horizontally placed, the original width detecting sensors 13a to 13d all detect the original 101 to be turned on. When the A4-size original 101 is placed vertically (as indicated by the dotted line in FIG. 11), the original width detecting sensors 13a and 13b detect the original 101 to be turned on, and the original width detecting sensors 13c and 13d do not detect the original 101 to be turned off. In this manner, the on or off state of each of the original width detecting sensors 13a to 13d is switched depending on the original width of the original 101.

The side regulating plates 123 operate so as to bring the original 101 to the center in the main scanning direction. The original width is detected when the original width detecting sensors 13a, 13b, 13c, and 13d detect whether or not the original has passed on the assumption that the original 101 is abutted against the side regulating plate 123 on a far side as viewed from the user. In another case, the original width detecting sensors 13a to 13d may be arranged not on one side but on both sides in the main scanning direction.

Figure 14:
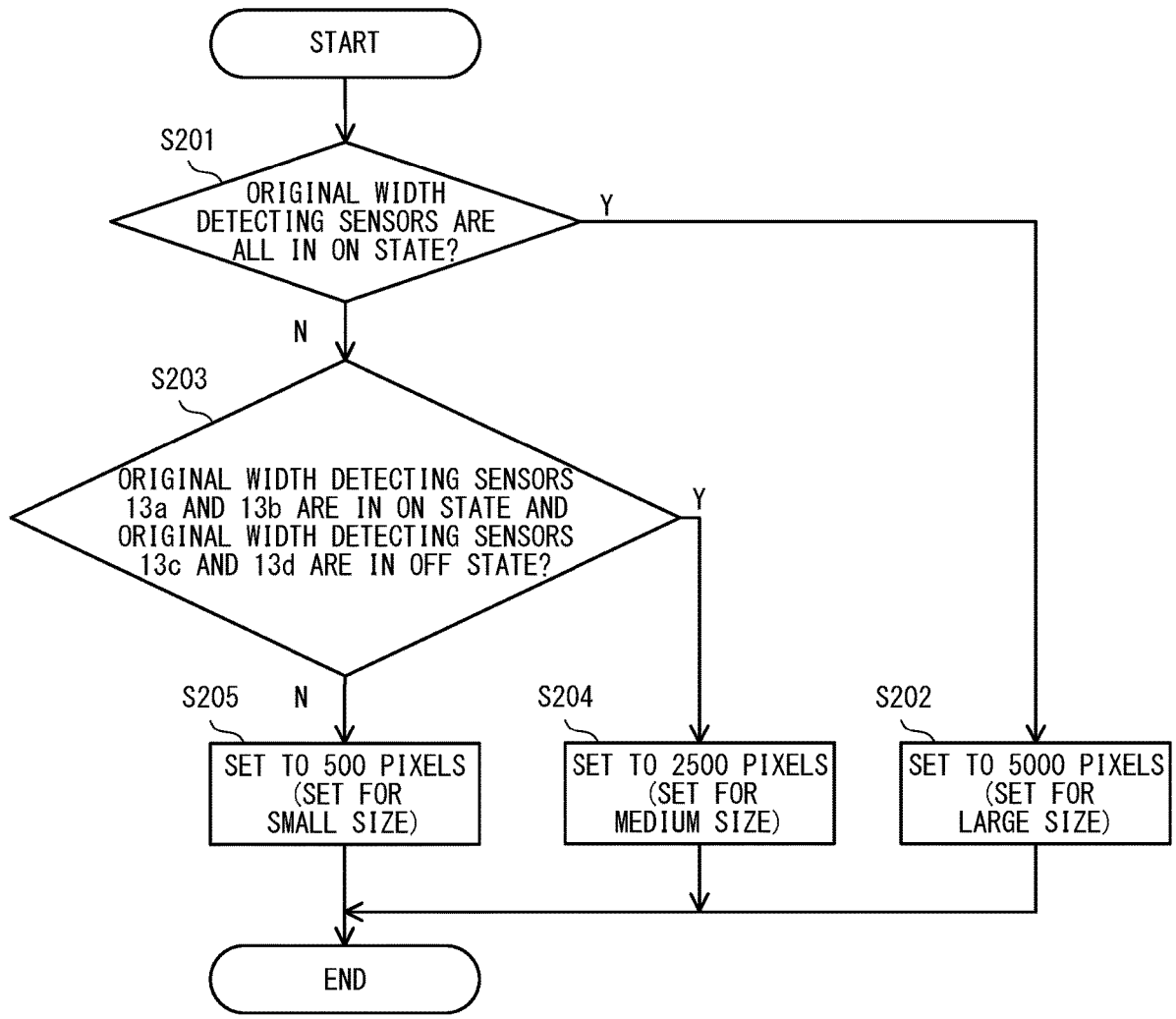
FIG. 14 is a flow chart for illustrating processing for setting an edge detection region.

The CPU 801 that has detected the original width of the original 101 being conveyed sets an edge detection region being a region in the main scanning direction of the image data to be used when the skew feeding detector 809 detects a leading edge (Step S111). FIG. 14 is a flow chart for illustrating edge detection region setting processing.

The CPU 801 refers to the width information stored in the RAM 803 in the processing of Step S110 to determine whether or not the original width detecting sensors 13a, 13b, 13c, and 13d are all in an on state in which the original 101 is detected (Step S201). When the original width detecting sensors 13a, 13b, 13c, and 13d are all in an on state (Step S201: Y), the CPU 801 sets the edge detection region to 5,000 pixels (Step S202). When all the original width detecting sensors 13a to 13d are in an on state, it is estimated that the original width of the original 101 is large. Therefore, the CPU 801 sets an edge detection region for a large size. Specifically, for example, the CPU 801 sets, as the edge detection region, a region of 2,500 pixels to the left and 2,500 pixels to the right from the center position of the width W in the main scanning direction.

When all the original width detecting sensors 13a, 13b, 13c, and 13d are not in an on state (Step S201: Y), the CPU 801 determines whether or not the original width detecting sensors 13a and 13b are in an on state and the original width detecting sensors 13c and 13d are in an off state (Step S203). When the original width detecting sensors 13a and 13b are in an on state and the original width detecting sensors 13c and 13d are in an off state (Step S203: Y), the CPU 801 sets the edge detection region to 2,500 pixels (Step S204). When the original width detecting sensors 13a and 13b are in an on state and the original width detecting sensors 13c and 13d are in an off state, it is estimated that the original width of the original 101 is medium. Therefore, the CPU 801 sets an edge detection region for a medium size. Specifically, for example, the CPU 801 sets, as the edge detection region, a region of 1,250 pixels to the left and 1,250 pixels to the right from the center position of the width W in the main scanning direction.

When the original width detecting sensors 13a and 13b are in an on state and the original width detecting sensors 13c and 13d are not in an off state (Step S203: N), the CPU 801 sets the edge detection region to 500 pixels (Step S205). When the original width detecting sensors 13a and 13b are in an on state and the original width detecting sensors 13c and 13d are not in an off state, it is estimated that the original width of the original 101 is small. Therefore, the CPU 801 sets an edge detection region for a small size. Specifically, for example, the CPU 801 sets, as the edge detection region, a region of 250 pixels to the left and 250 pixels to the right from the center position of the width W in the main scanning direction.

In this manner, the CPU 801 sets the edge detection region larger as the original width is larger. The edge detection regions of 5,000 pixels, 2,500 pixels, and 500 pixels are merely examples, and different numbers of pixels may be used as long as the magnitude relationship does not reverse. In addition, in the second embodiment, the edge detection region is classified into three levels, but is not limited to three levels. In another case, the edge detection region may be set so as to match the original width detected on the conveyance path or the original width detected on the original tray 102.

The CPU 801 that has set the edge detection region waits until the lead sensor 17 detects the original 101 (is turned on) (Step S112). At a timing at which the lead sensor 17 is turned on, the CPU 801 starts to read the image on the first surface of the original 101 by the first reading unit 402 (Step S113). The CPU 801 may provide a waiting time until the image reading is started by counting the driving pulse number of the reading motor 807 during a time period after the lead sensor 17 is turned on and before the image reading is started.

The CPU 801 causes the skew feeding detector 809 to start to perform, on the image data output from the first reading unit 402, edge detection processing for detecting the leading edge and processing for detecting the skew feeding amount of the original based on the image data within the edge detection region set in the processing of Step S111 (Step S114). When the skew feeding amount is detected, the skew feeding detector 809 transmits an interrupt signal to the CPU 801. When an interrupt signal is acquired from the skew feeding detector 809, the CPU 801 completes the edge detection processing performed by the skew feeding detector 809 (Step S115).

When the reading of the original 101 for one page is completed (Step S116), the CPU 801 causes the image processor 808 to perform the above-mentioned image processing on the image data for one page. At this time, the image processor 808 performs the skew feeding correction (registration correction) based on the skew feeding amount detected by the skew feeding detector 809. Thus, the inclination of the read image due to the skew feeding of the original 101 is corrected. When an image transmission request is received from the CPU 901 through the communication line 301, the CPU 801 causes the image processor 808 to transmit the image data subjected to the image processing to the image processing controller 300 through the image communication line 305.

The CPU 801 that has completed the reading determines the presence or absence of the next original on the original tray 102 based on the detection result obtained by the original presence detecting sensor 14 (Step S117). When the next original is present on the original tray 102 (Step S117: Y), the CPU 801 repeatedly performs the processing of Step S105 and the subsequent steps until no more original is present on the original tray 102. When no more next original is present on the original tray 102 (Step S117: N), the CPU 801 waits until the original 101 is delivered (Step S118). It is determined that the original 101 has been delivered based on the detection result obtained by the delivery sensor 18.

When the original 101 is delivered, the CPU 801 stops driving the separation motor 805, the drawing motor 806, and the reading motor 807 (Step S119). After that, the CPU 801 drives the optical motor 804 to move the first reading unit 402 to a predetermined waiting position (Step S120). The waiting position of the first reading unit 402 is set to, for example, the shading position. Thus, when the next image reading processing is instructed, the entire processing time period is shortened. After the above-mentioned processing, the image reading processing is brought to the end.

As described above, the image reading apparatus 1000 according to the second embodiment sets the edge detection region based on the size of the original 101 in the main scanning direction. Thus, skew feeding detection based on an appropriate region depending on the size of the original 101 in the main scanning direction can be achieved, and the skew feeding amount can be detected with high accuracy. That is, it is possible to suppress a decrease in accuracy of reading the conveyed original to detect the skew feeding amount of the original. Therefore, the skew feeding correction at the time of flow reading can be performed with high accuracy not only for the originals 101 of standard sizes including the A4 size and the LTR size but also for a business card, a slip, and a check and other such originals 101 of various sizes.

Third Embodiment

Description of a part of an image reading apparatus having the same configuration as that of the image reading apparatus according to the second embodiment is omitted. In the second embodiment, the edge detection region is set based on the original width detected by the original width detecting sensors 13a, 13b, 13c, and 13d during the conveyance of the original 101. In a third embodiment of the present disclosure, the edge detection region is set based on the detection result obtained by the tray width detecting sensor 12.

Image Reading Processing

Figure 15:
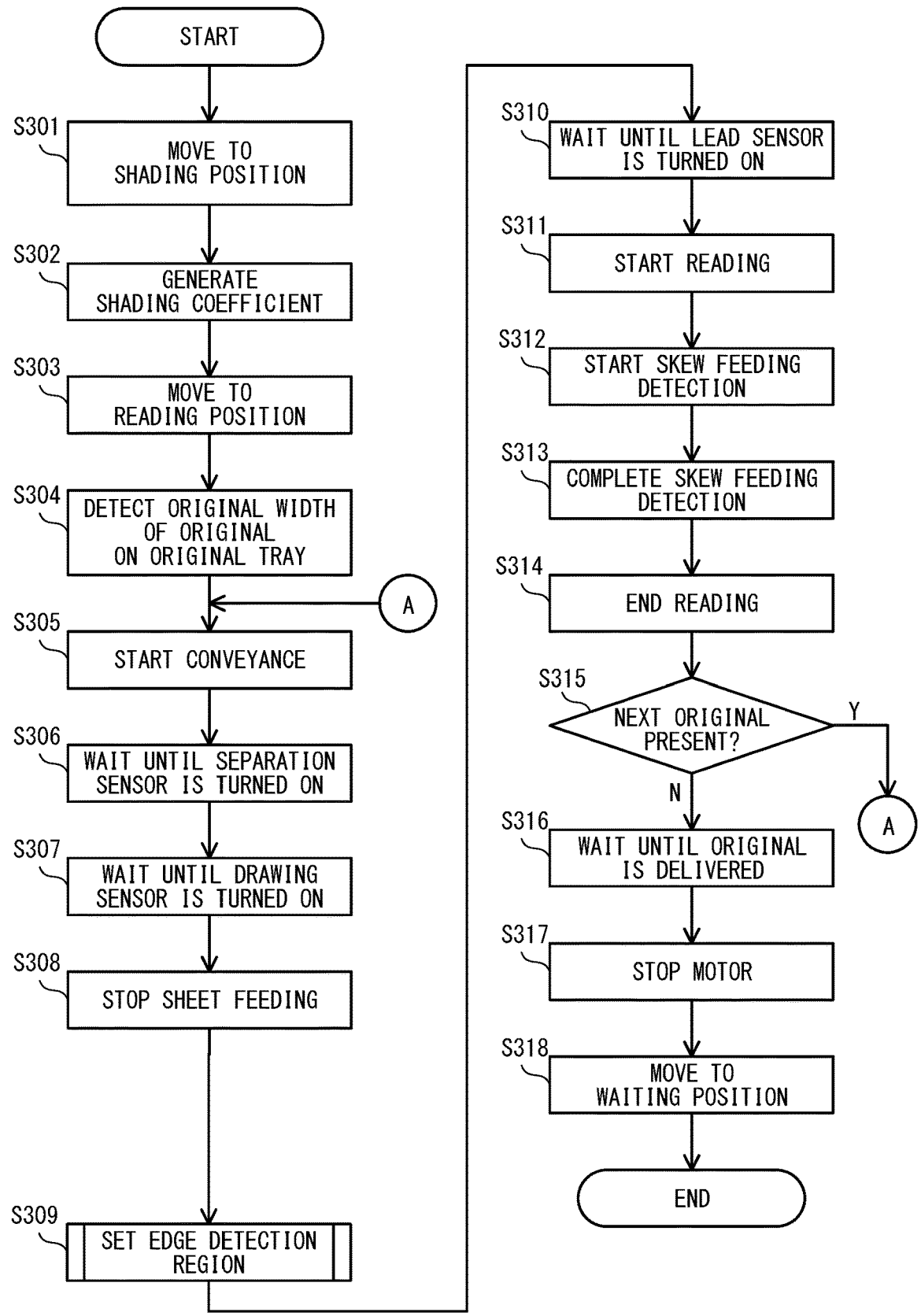
FIG. 15 is a flow chart for illustrating image reading processing.

FIG. 15 is a flow chart for illustrating the image reading processing through flow reading. This processing starts when the CPU 901 receives an instruction to start the image reading from the operating device 202. When the instruction to start the image reading is received, the CPU 901 instructs the CPU 801 to read the image.

Figure 16:
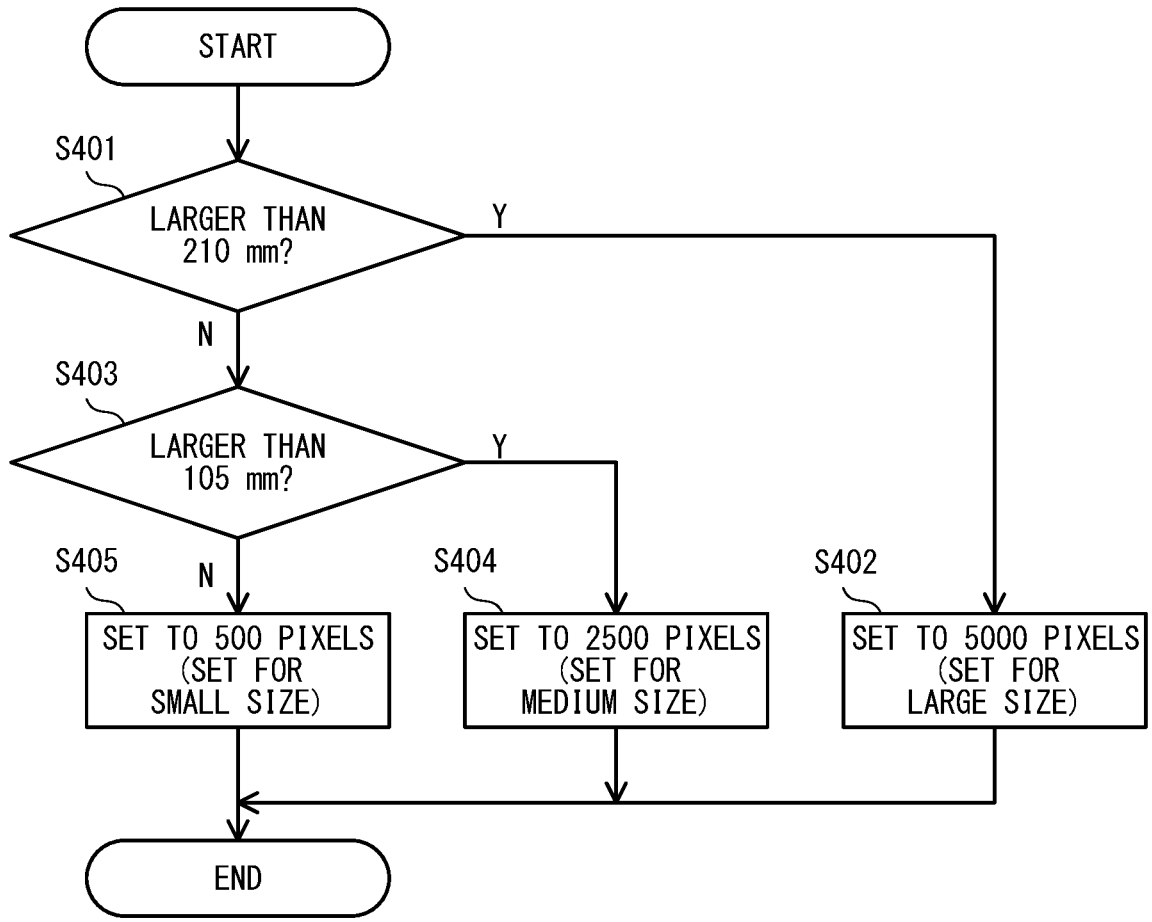
FIG. 16 is a flow chart for illustrating processing for setting the edge detection region.

The processing from feeding the original 101 after generation of the shading coefficient to stopping the sheet feeding through detection of the original 101 by the drawing sensor 16 is the same as the processing of from Step S101 to Step S108 of FIG. 13 (Step S301 to Step S308). When the sheet feeding is stopped, the CPU 801 sets the edge detection region (Step S309). FIG. 16 is a flow chart for illustrating the edge detection region setting processing.

The CPU 801 determines whether or not the original width Ls detected in the processing of Step S304 is larger than a first predetermined width, specifically in this example, 210 mm (Step S401). When the original width Ls is larger than 210 mm (Step S401: Y), the CPU 801 sets the edge detection region to 5,000 pixels (Step S402). When the original width Ls is larger than 210 mm, the CPU 801 sets the edge detection region for a large size.

When the original width Ls is not larger than 210 mm (Step S401: Y), the CPU 801 determines whether or not the original width Ls is larger than a second predetermined width smaller than the first predetermined width, specifically in this example, 105 mm (Step S403). When the original width Ls is larger than 105 mm (Step S403: Y), the CPU 801 sets the edge detection region to 2,500 pixels (Step S404). When the original width Ls is larger than 105 mm and smaller than 210 mm, it is estimated that the original width Ls of the original 101 is medium. Therefore, the CPU 801 sets the edge detection region for a medium size.

When the original width Ls is not larger than 105 mm (Step S403: N), the CPU 801 sets the edge detection region to 500 pixels (Step S405). When the original width Ls is smaller than 105 mm, the CPU 801 sets the edge detection region for a small size.

In this manner, the CPU 801 sets the edge detection region larger as the original width increases. These regions, for detecting skew feeding, of 5,000 pixels, 2,500 pixels, and 500 pixels are merely examples, and different numbers of pixels may be used as long as the magnitude relationship does not reverse. In addition, in the third embodiment, the edge detection region is classified into three levels, but is not limited to three levels.

In the same manner as in the processing of from Step S112 to Step S120 of FIG. 13, the CPU 801 that has set the edge detection region reads the original image until no more original is placed on the original tray 102, performs the skew feeding correction of the read image, and performs image reading, to thereby bring the processing to the end (Step S310 to Step S318).

As described above, an image reading apparatus 1000 according to the third embodiment sets the edge detection region based on the size of the original 101 placed on the original tray 102 in the main scanning direction. The edge detection region is set based on the original width Ls that is more accurate than the original width detected from the original 101 being conveyed. Thus, the skew feeding detection based on an appropriate region depending on the size of the original 101 in the main scanning direction can be achieved, and the skew feeding amount can be detected with higher accuracy. That is, it is possible to suppress a decrease in accuracy of reading the conveyed original 101 to detect the skew feeding amount of the original. Therefore, the skew feeding correction at the time of flow reading can be performed with high accuracy not only for the originals 101 of standard sizes including the A4 size and the LTR size but also for a business card, a slip, and a check and other such originals 101 of various sizes.

When the originals 101 are stacked unevenly on the original tray 102 or when the originals 10 having different sizes are stacked, the original 101 is likely to be greatly skewed. In such a case, the image reading apparatus 1000 according to each of the second embodiment and third embodiment performs conveyance control on the originals 101 so as to increase the distance (sheet gap) between the continuously conveyed originals 101. Thus, the image reading apparatus 1000 becomes usable while preventing a loss in the read image and minimizing deterioration in productivity.

Fourth Embodiment

In the following description, a description of a part of an image reading apparatus having the same configuration as that of the image reading apparatus according to the first embodiment is omitted.

In the first embodiment, the second embodiment, and the third embodiment, the registration information is calculated based on the side at the leading edge of the original. In a fourth embodiment of the present disclosure, the registration information is calculated based on a side at the side edge that is adjacent to the side at the leading edge of the original. The following description is given by taking the configuration of the controller 200 in the first embodiment as an example, but a method of calculating the registration information in the fourth embodiment may be applied to the control system in the second embodiment.

Registration Information

The front surface registration calculator 207 calculates, based on the binarized data, an inclination angle θ2 of the image on the first surface (front surface) with respect to the sub-scanning direction, the angle direction (sign), the upper left coordinates (x1, y1), and a width H of the original image in the sub-scanning direction in the acquired binarized data, and transmits the calculated information to the CPU 203. Specifically, the front surface registration calculator 207 calculates the width H based on the shadow represented by the acquired binarized data (shadow of a side at the leading edge of the original and shadow of a side at a side edge adjacent to the side at the leading edge). More specifically, the front surface registration calculator 207 calculates, as the width H, a length from the shadow at the leading edge to the shadow at the trailing edge in the acquired binarized data in the sub-scanning direction. The front surface registration calculator 207 also performs, for example, linear approximation on pixel data in a sub-scanning pixel width (pixel data corresponding to the shadow of the side at the side edge of the original 101), which is described later, to thereby detect the side at the side edge of the original 101 and calculate the angle θ2 and the angle direction (sign) based on the detection result. Further, the front surface registration calculator 207 calculates, as the upper left coordinates (x1, y1), an intersection point of, for example, a linearly approximated straight line and a perpendicular line passing through a position of a pixel corresponding to the shadow of the side at the leading edge of the original 101 at a position having an x-coordinate of a predetermined value among a plurality of perpendicular lines to the linearly approximated straight line. The predetermined value is set at a position at which a pixel corresponding to the shadow of the side at the leading edge of the original 101 is located and which exerts no influence of breakage, bend, or fold at both ends of the original. For example, the predetermined value may be set at a position at a leading edge (x-coordinate of between 3000 and 4500) in the binarized data acquired by the front surface registration calculator 207.

The registration correction is performed when, for example, the image data is read from the image memory 205 along the side at the leading edge of the original image (along the direction of the angle θ2) from the upper left coordinates (x1, y1). The registration correction may be performed by, for example, general affine transformation.

When the angle θ2 is to be calculated from the image on the first surface (front surface), the front surface registration calculator 207 selects a pixel width in the sub-scanning direction (sub-scanning pixel width), which is an effective region (edge detection region) to be used for calculating the angle θ2.

In regard to the sub-scanning pixel width, the method described with reference to FIG. 7A, FIG. 7B, and FIG. 7C may be applied by replacing the main scanning direction by the sub-scanning direction. A sub-scanning size A (corresponding to the main scanning size A in the first embodiment) may be calculated based on, for example, a conveying speed of the original and a time period after the leading edge of the original is detected by a sensor, for example, the original detecting sensor 113, provided on the conveyance path until the trailing edge of the original is detected by the sensor. In another case, the sub-scanning size A (corresponding to the main scanning size A in the first embodiment) may be determined based on, for example, the size of the original determined based on the detection results obtained by the original length detecting sensors 810 and 811 in the second embodiment.

According to the first embodiment, the second embodiment, the third embodiment, and the fourth embodiment described above, it is possible to suppress a decrease in detection accuracy of the skew feeding amount of the original.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-204181, filed Nov. 11, 2019, Japanese Patent Application No. 2020-012171, filed Jan. 29, 2020, and Japanese Patent Application No. 2020-168327, filed Oct. 5, 2020, which are hereby incorporated by reference herein in their entirety.

What is claimed is:
1. An image reading apparatus, comprising:
an original tray configured to receive an original to be placed on the original tray;
a conveyor configured to convey the original placed on the original tray in a conveying direction;
a reading unit configured to read an image of the original conveyed by the conveyor, the reading unit including:
a light-receiving element configured to receive light; and
a generator configured to generate pixel data representing a light reception result obtained by the light-receiving element;
an acquisition unit configured to acquire information relating to a length of the original to be read by the reading unit in a main scanning direction orthogonal to the conveying direction;
one or more processors, at least one of the one or more processors operating to determine a position of one end portion and a position of another end portion of the image of the original in the main scanning direction, the image being represented by a plurality of pieces of pixel data generated by the generator;
a setting unit configured to set an ineffective region based on the information acquired by the acquisition unit, wherein the ineffective region is a region in the main scanning direction of the pixel data which is not to be used for determination of an inclination amount corresponding to an inclination angle, with respect to the main scanning direction, of a side at a leading edge of the original in the conveying direction, the ineffective region includes:
a region between the position of the one end portion and a position spaced apart from the position of the one end portion in the main scanning direction by a setting distance; and
a region between a position spaced apart from the position of the another end portion in the main scanning direction by the setting distance and the position of the another end portion,
the setting distance being shorter than a distance between the position of the one end portion and a center position of the image of the original in the main scanning direction, the image being represented by the plurality of pieces of pixel data,
the setting unit being configured to set the setting distance so that a length of the ineffective region in the main scanning direction when the length of the original in the main scanning direction is a first length is longer than a length of the ineffective region in the main scanning direction when the length of the original in the main scanning direction is a second length, which is shorter than the first length; and
a corrector configured to perform skew correction,
wherein the at least one of the one or more processors operates to determine the inclination amount based on the plurality of pieces of pixel data which corresponds to the side at the leading edge of the original included in a region except for the ineffective region in the main scanning direction, and
wherein the corrector is configured to perform the skew correction for correcting the image represented by the pixel data so as to reduce the inclination amount determined by the at least one of the one or more processors.

2. The image reading apparatus according to claim 1, further comprising an opposing member provided opposite to the reading unit across a conveyance path on which the original is to be conveyed at a reading position at which the reading unit is to read the image of the original,
wherein the reading unit includes a light source configured to emit light,
wherein the at least one of the one or more processors operates to detect a shadow generated on the opposing member by the light emitted from the light source and the conveyed original, and
wherein the at least one of the one or more processors operates to determine the inclination amount based on one of the plurality of pieces of pixel data corresponding to the shadow included in the region except for the ineffective region in the main scanning direction.

3. The image reading apparatus according to claim 2, wherein the opposing member is white.

4. The image reading apparatus according to claim 2, wherein the pixel data includes a luminance value representing an intensity of the light received by the light-receiving element, and
wherein the detector is configured to detect the shadow based on the luminance value.

5. The image reading apparatus according to claim 1, further comprising a detector configured to detect the length of the original placed on the original tray in the main scanning direction,
wherein the acquisition unit is configured to acquire, as the information, a detection result obtained by the detector.

6. The image reading apparatus according to claim 1, further comprising a plurality of sensors, which are arranged at different positions in the main scanning direction on a conveyance path on which the original is to be conveyed, and are configured to detect the original,
wherein the acquisition unit is configured to acquire, as the information, a detection result obtained by the plurality of sensors.

7. The image reading apparatus according to claim 1, wherein the acquisition unit is configured to acquire, as the information, a length between the one end portion and the another end portion that are determined by the at least one of the one or more processors.

8. An image reading apparatus, comprising:
an original tray configured to receive an original to be placed on the original tray;
a conveyor configured to convey the original placed on the original tray in a conveying direction;
a reading unit configured to read an image of the original conveyed by the conveyor, the reading unit including:
a light-receiving element configured to receive light; and
a generator configured to generate pixel data representing a light reception result obtained by the light-receiving element;
an acquisition unit configured to acquire information relating to a length of the original to be read by the reading unit in a main scanning direction orthogonal to the conveying direction;
one or more processors, at least one of the one or more processors operating to determine a position of one end portion and a position of another end portion of the image of the original in the main scanning direction, the image being represented by a plurality of pieces of pixel data generated by the generator;
a setting unit configured to set an ineffective region based on the information acquired by the acquisition unit, wherein the ineffective region is a region in the main scanning direction of the pixel data which is not to be used for determination of an inclination amount corresponding to an inclination angle, with respect to the main scanning direction, of a side at a leading edge of the original in the conveying direction,
the ineffective region includes:
a region between the position of the one end portion and a position spaced apart from the position of the one end portion in the main scanning direction by a setting distance; and
a region between a position spaced apart from the position of the another end portion in the main scanning direction by the setting distance and the position of the another end portion,
the setting distance being shorter than a distance between the position of the one end portion and a center position of the image of the original in the main scanning direction, the image being represented by the plurality of pieces of pixel data,
the setting unit being configured to set the ineffective region when the length of the original in the main scanning direction is a first length, and configured not to set the ineffective region when the length of the original in the main scanning direction is a second length, which is shorter than the first length; and
a corrector configured to perform skew correction,
wherein the at least one of the one or more processors operates to determine the inclination amount based on the plurality of pieces of pixel data which corresponds to the side at the leading edge of the original included in a region except for the ineffective region in the main scanning direction, and wherein the corrector is configured to perform the skew correction for correcting the image represented by the pixel data so as to reduce the inclination amount determined by the at least one of the one or more processors.

9. The image reading apparatus according to claim 8, further comprising an opposing member provided opposite to the reading unit across a conveyance path on which the original is to be conveyed at a reading position at which the reading unit is to read the image of the original, wherein the reading unit includes a light source configured to emit light, wherein the at least one of the one or more processors operates to detect a shadow generated on the opposing member by the light emitted from the light source and the conveyed original, and wherein the at least one of the one or more processors operates to determine the inclination amount based on one of the plurality of pieces of pixel data corresponding to the shadow included in the region except for the ineffective region in the main scanning direction.

10. The image reading apparatus according to claim 9, wherein the opposing member is white.

11. The image reading apparatus according to claim 9, wherein the pixel data includes a luminance value representing an intensity of the light received by the light-receiving element, and wherein the detector is configured to detect the shadow based on the luminance value.

12. The image reading apparatus according to claim 8, further comprising a detector configured to detect the length of the original placed on the original tray in the main scanning direction, wherein the acquisition unit is configured to acquire, as the information, a detection result obtained by the detector.

13. The image reading apparatus according to claim 8, further comprising a plurality of sensors, which are arranged at different positions in the main scanning direction on a conveyance path on which the original is to be conveyed, and are configured to detect the original, wherein the acquisition unit is configured to acquire, as the information, a detection result obtained by the plurality of sensors.

14. The image reading apparatus according to claim 8, wherein the acquisition unit is configured to acquire, as the information, a length between the one end portion and the another end portion that are determined by the at least one of the one or more processors.

* * * * *